(12) United States Patent
Krell et al.

(10) Patent No.: US 9,546,830 B2
(45) Date of Patent: Jan. 17, 2017

(54) COMPOSITE HANGER GRID AND COMPONENTS, SPLASH BAR, ASSEMBLY THEREOF AND METHOD OF ASSEMBLY

(71) Applicant: Brentwood Industries, Inc., Reading, PA (US)

(72) Inventors: Timothy E. Krell, Mohrsville, PA (US); Frank M. Kulick, III, Leesport, PA (US); Scott C. Shoemaker, Boyertown, PA (US)

(73) Assignee: Brentwood Industries, Inc., Reading, PA (US)

( * ) Notice: Subject to any disclaimer, the term of this patent is extended or adjusted under 35 U.S.C. 154(b) by 221 days.

(21) Appl. No.: 14/166,397

(22) Filed: Jan. 28, 2014

(65) Prior Publication Data

US 2015/0211818 A1 Jul. 30, 2015

(51) Int. Cl.
*F28F 25/08* (2006.01)
*B23P 15/26* (2006.01)
*F28C 1/04* (2006.01)

(52) U.S. Cl.
CPC .............. *F28F 25/082* (2013.01); *B23P 15/26* (2013.01); *F28C 1/04* (2013.01); *Y10T 29/49359* (2015.01)

(58) Field of Classification Search
CPC .............. B23P 15/26; F28C 1/00; F28C 1/04; F28F 25/082; Y10T 29/49359
USPC ................................... 261/108, 111, DIG. 11
See application file for complete search history.

(56) References Cited

U.S. PATENT DOCUMENTS

| | | | | |
|---|---|---|---|---|
| 1,953,372 A | * | 4/1934 | Stillger | F28F 25/082 |
| | | | | 261/108 |
| 3,189,329 A | * | 6/1965 | Smith | F28C 1/02 |
| | | | | 261/109 |
| 3,389,895 A | * | 6/1968 | De Flon | F28C 1/04 |
| | | | | 261/111 |
| 3,751,017 A | * | 8/1973 | Lemmens | F28F 25/085 |
| | | | | 261/111 |
| 3,879,502 A | | 4/1975 | Furlong et al. | |
| 3,894,127 A | * | 7/1975 | Fordyce | F28C 1/04 |
| | | | | 261/111 |
| 4,115,484 A | | 9/1978 | Saxton | |
| 4,133,851 A | * | 1/1979 | Ovard | F28F 25/082 |
| | | | | 239/504 |
| 4,178,333 A | | 12/1979 | Shepherd | |
| 4,181,692 A | | 1/1980 | Stone | |

(Continued)

*Primary Examiner* — Charles Bushey
(74) *Attorney, Agent, or Firm* — Panitch Schwarze Belisario & Nadel LLP

(57) ABSTRACT

A composite hanger grid for supporting splash bars in a cooling tower uses separate vertical suspension members and horizontal beams by which all of the operational loads imposed on the splash bars are transferred to the horizontal beams, which then transfer the load to the vertical suspension members. Since all of the horizontal beams are independent of each other and separate components from the vertical suspension members, the horizontal beams will be loaded equally throughout the entire hanger grid. Also disclosed are components of the composite hanger grid, splash bars adapted for use with specific embodiments of the composite hanger grid, assemblies of the composite hanger grid with its supported splash bars, a method of assembling a composite hanger grid and a method of assembling an evaporative cooler fill assembly, including hanger grids and splash bars, in a cooling tower.

49 Claims, 14 Drawing Sheets

(56) References Cited

U.S. PATENT DOCUMENTS

| | | | |
|---|---|---|---|
| 4,269,795 A | 5/1981 | Bosman | |
| 4,451,411 A * | 5/1984 | Lefevre | F28F 25/085 248/544 |
| 4,515,735 A * | 5/1985 | Phelps | F28F 25/082 261/111 |
| 4,557,878 A | 12/1985 | Fulkerson | |
| 4,576,764 A | 3/1986 | Shepherd et al. | |
| 4,578,227 A | 3/1986 | Ovard | |
| 4,678,615 A | 7/1987 | Stambolov et al. | |
| 4,705,653 A | 11/1987 | Stackhouse et al. | |
| 4,774,034 A | 9/1988 | Fritz | |
| 4,868,956 A * | 9/1989 | Shepherd | F28F 25/082 24/336 |
| 4,915,877 A * | 4/1990 | Shepherd | F28F 25/082 261/111 |
| 4,996,008 A * | 2/1991 | Peterson | F28F 25/085 261/111 |
| 5,279,774 A * | 1/1994 | Remy | F28F 25/082 261/111 |
| 5,454,987 A * | 10/1995 | Cornwell, Jr. | F28F 25/082 261/111 |
| 5,540,867 A | 7/1996 | DeBello | |
| 6,708,960 B2 | 3/2004 | Olson et al. | |
| 6,877,727 B2 | 4/2005 | Olson et al. | |
| 7,275,736 B2 | 10/2007 | Mockry et al. | |
| 7,618,026 B2 | 11/2009 | Armstrong | |
| RE41,723 E | 9/2010 | Olson et al. | |
| 2007/0176308 A1 | 8/2007 | Shepherd | |

* cited by examiner

COMPOSITE HANGER GRID AND COMPONENTS, SPLASH BAR, ASSEMBLY THEREOF AND METHOD OF ASSEMBLY

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The present invention relates to a composite hanger grid for supporting splash bars in a cooling tower, components of the composite hanger grid, splash bars adapted for use with specific embodiments of the composite hanger grid, assemblies of the composite hanger grid with its supported splash bars, a method of assembling a composite hanger grid and a method of assembling an evaporative cooler fill assembly, including hanger grids and splash bars, in a cooling tower.

Cooling towers are open loop direct contact evaporative heat exchangers used to provide a heat sink for a wide variety of waste heat applications. Hot process water is delivered to the cooling tower via nozzles from above. The water from the nozzles is distributed and cascades over the media typically called "fill" which provides surface area from both the droplet and a structure for mass transfer and subsequently latent heat removal. Air delivery is through either natural draft or forced ventilation. Depending on the direction of air flow through the cooling tower with respect to the cooling liquid, typically water, the cooling tower may be concurrent (air and water flow in the same downward direction), which is rare due to less turbulent interaction of the air and water, counter-current (water flows downwardly and air flows upwardly), or cross-flow (water flows downwardly and air flows sideways). The composite hanger grids, components, splash bars and assemblies thereof according to the present invention may be used with any of these types of cooling towers, preferably with counter-current and cross-flow cooling towers.

The tower fill utilized depends upon the tower application, which varies widely based on many factors. For instance, a splash fill is typically used for applications where the water source contains solid impurities or fouling is expected. A number of variations exist for tower fill including splash fill that relies on the impact of falling water on a surface to provide relatively small water droplets of high surface area to volume ratios. Fill surface area also contributes to the mass transfer capacity. Splash bars are a variation of splash fill that requires a support system to position the splash bars at the appropriate location in the cooling tower for proper operation. As the name suggests, splash bars are generally longitudinal shaped bars or beams that must span support members within the cooling tower where the spacing between supports is typically 2 feet. Splash bars themselves vary in length and shape, but are generally limited to 12 feet in length and five 5 inches in width for ease of assembly.

The splash bars are offset both vertically and horizontally so that water droplets falling vertically from near the top of the cooling tower will invariably strike one or more of the splash bars below the water distribution system and from higher splash bars onto lower splash bars during descent. Large water droplets are broken into smaller water droplets upon striking one of the splash bars. As many water droplets strike the splash bars, a thin film of water tends to form on each splash bar which increases the surface area of water exposed to air to enhance evaporative cooling.

Typical prior art splash bar support grids, called hanger grids, are a mesh of perpendicular members usually spaced at fixed dimensions of 4 inches horizontally and either 4 or eight 8 inches vertically to form windows within which the splash bars are supported on the horizontal members. The hanger grids having 4-inch vertical spacing are installed at the top of a cooling tower (near the fan in the case of a mechanical-draft tower) to prevent excessive localized air velocities and create an even pressure drop throughout the cooling tower, when hanger grids having 8-inch vertical spacing are installed toward the middle and bottom of the cooling tower. The grids formed by the mesh are generally 2 or 4 feet in width and 4, 6 or 8 feet in height. The hanger grids can be sized to fit within a fill section where air and water interact within cooling towers of various designs and dimensions.

Currently, splash bars are supported by one of several accepted methods. The first method utilizes a wire mesh grid with horizontal and vertical wire members that are spot welded at the crossing points and treated for corrosion resistance. One treated version uses a dipped plastic coating; however, the vibration and movement of the splash bars within the tower from air flow causes localized wearing of the coating at contact points between the grid and the splash bar, thereby exposing the wire to corrosion and ultimately failure of the wire. The second treated version uses galvanized metal; however, chemical treatment erodes the zinc coating leading to a similar local degradation of the material and associated failure mechanism as the coated wire mesh. Stainless steel wire mesh is also used; however, the spot welded connection is typically limiting in its structural capacity and is the point of failure for this application.

Plastic injection molded grids are used to provide a similar spacing arrangement and typically have an integrated connection method for splash bar attachment molded into either the vertical or horizontal members. The plastic grids are generally molded as a single unit of 2 or 4 feet in width and 4, 6 or 8 feet in height. The plastic grids tend to fail at the areas of high stress near the top of the splash grid hanger as the load from the lower levels is additive upwardly on the grid toward the upper connection to the cooling tower structure. As the load increases, the stress in the vertical support members of the grid also increases. The material properties are exceeded locally near the top as the stress surpasses the ultimate strength of the material at the design cross section able to support the load. The current plastic products attach via holes in the vertical members, concentrating the stress at these locations therefore further reducing the strength of the product.

Typical splash bars are slightly greater in width than the 4-inch openings of the support grids to eliminate bypass of the cascading water. As a result, the splash bars must be rotated on edge to be inserted into the hanger grid. Notches punched into one or both edges of the splash bars allow the splash bar to lay flat on the horizontal members of the hanger grid while encompassing the vertical members of the hanger grid. There are problems regarding the installation and retention of the splash bars on the horizontal members. The process of rotating the splash bars in the narrow windows during installation complicates and increases the time required for installation.

The splash bars are typically held in place within the windows of the hanger grids by external clips, opposing clips integrally molded, or large staples (termed "hog rings"). The method of attachment is critical in maintaining the splash bars in position and can have a significant impact on cost due to manpower required to attach the splash bar to the support at every grid location. Commonly, the grids are installed sequentially up to the length of the splash bar. Access is not available from the side or other end. The splash bars are inserted from one end and clipped or stapled at the single exiting end location. This leaves the unattached end of the splash bar to move freely within the grid windows due to the lateral and vertical air flow required for mass transfer. In cases where access is available, increased manpower is required to attach all clip locations of the grid to the splash bars.

Two methods are typically employed to secure hanger grids to the cooling tower structure. With wire mesh support grids, a separate bracket is first fastened to the cooling tower support structure using screws or nails. The wire hanger grid is then hung from the bracket, typically by the top horizontal wire. The load of multiple panels connected together is then applied to the spot welds of the top horizontal wire which may end in failure of the welds, particularly in cold climates where ice may form on the hanger grids and splash bars in winter. Injection molded plastic hangers typically feature nail or screw holes in either the top horizontal member or near the top of the vertical members. The same principle of accumulated load of multiple connected panels also applies to the plastic panels which results in the load surpassing the ultimate strength of the plastic vertical members. Typical top hanging brackets are designed to extend over the top of horizontal structural beams within the cooling tower to "hook" the hanger grid onto the horizontal structural beam. Different beam sizing for major and minor structural support beams for the hanger grids (e.g., structural support beams having different heights, such as 2 inches by 4 inches compared to 2 inches by 6 or 8 inches) cause the top elevation not to have uniform heights within the cooling tower, requiring measurement for exact placement of a rotated hanger grid, where the side opposite the hook is extending away from the structural beam.

The foregoing problems associated with the prior art hanger grids, splash bars and their assembly are overcome by the various aspects and embodiments encompassed by the present invention including a composite hanger grid for supporting splash bars in a cooling tower, components of the composite hanger grid, splash bars adapted for use with specific embodiments of the composite hanger grid, assemblies of the composite hanger grid with its supported splash bars, a method of assembling a composite hanger grid and a method of assembling an evaporative cooler fill assembly, including hanger grids and splash bars, in a cooling tower.

BRIEF SUMMARY OF THE INVENTION

One aspect or embodiment of the present invention relates to a composite hanger grid having a top and a bottom and a width, the hanger grid being capable of supporting splash bars generally perpendicular to the hanger grid, wherein each splash bar has a first side edge and a second side edge, the hanger grid comprising: a plurality of vertical suspension members, each suspension member having a longitudinal axis and a continuous length extending at least to the bottom of the hanger grid; at least two vertically aligned horizontal beams as separate components from the vertical suspension members, each horizontal beam having a first end, a second end, a bottom, a length, and at least one upper surface portion being capable of supporting a splash bar, all of the suspension members extending substantially perpendicularly through the horizontal beams at two or more spaced locations along the length of the horizontal beams; each horizontal beam being supported by a structure associated with and at one of any variable locations along the length of the suspension members by which the horizontal beams are supported in tension by the suspension members, whereby the suspension members and the horizontal beams form a grid of a plurality of windows defined by the suspension members and the horizontal beams.

Another aspect or embodiment of the present invention relates to a horizontal beam for use as a separate component of a composite hanger grid having windows, the horizontal beam being capable of supporting at least one splash bar generally perpendicular to the hanger grid, wherein each splash bar has a first side edge and a second side edge, the horizontal beam having a first end, a second end, a bottom, a length, and at least one upper surface portion, each upper surface portion being capable of supporting a splash bar, the horizontal beam having holes from the bottom to top adjacent to both ends, whereby the horizontal beam is supportable by vertical suspension members extending substantially perpendicularly through the holes in the horizontal beams.

Still another aspect or embodiment of the present invention relates to splash bar capable of being supported on a horizontal beam and retained against dislodgement within windows defined by the horizontal beams and vertical members in a hanger grid, the splash bar having an elongated shape with a longitudinal axis, a top, a bottom, a front end, a back end, a length and a width, a first side edge and a second side edge, the first side edge being free of openings extending to the first side edge such that the splash bar is capable of freely sliding on horizontal beams generally perpendicular through aligned windows of a plurality of parallel hanger grids, the second side edge having a plurality of elongated slots spaced parallel to and longitudinally along the second side edge adjacent to locations where vertical members of the windows of adjacent, parallel hanger grids are located, the elongated slots extending to the second side edge, the splash bar further comprising locking structures equally spaced from, on opposite front and back sides of and longitudinally aligned with the elongated slots, whereby extensions on locking portions associated with the hanger grid having projections on lower surfaces of the extensions have bearing surfaces that are capable of interlocking with the locking structures such that the splash bar is capable of being retained against longitudinal dislodgement in the windows and the second side edge is capable of being retained on the horizontal beams against vertical dislodgement in the windows.

Another aspect or embodiment of the present invention relates to an evaporative cooler fill assembly capable of being supported within a fill section in a cooling tower, the cooling tower having a top, a bottom, a front, a back, a first side and a second side, the assembly comprising a plurality of horizontally spaced, composite hanger grids, each composite hanger grid being supported on one of a plurality of parallel structural support members within the fill section of the cooling tower, the composite hanger grid being capable of supporting splash bars generally perpendicular to the hanger grid, wherein each splash bar has a first side edge and a second side edge, the hanger grid comprising:

a plurality of vertical suspension members, each suspension member having a longitudinal axis and a continuous length extending at least to the bottom of the hanger grid;

at least two vertically aligned horizontal beams as separate components from the vertical suspension members, each horizontal beam having a first end, a second end, a bottom, a length, and at least one upper surface portion being capable of supporting a splash bar, all of the suspension members extending substantially perpendicularly through the horizontal beams at two or more spaced locations along the length of the horizontal beams;

each horizontal beam being supported by a structure associated with and at one of any variable locations along the length of the suspension members by which the horizontal beams are supported in tension by the suspension members, whereby the suspension members and the horizontal beams form a grid of a plurality of windows defined by the vertical suspension members and the horizontal beams; and splash bars supported generally perpendicularly within the assembly by the horizontal beams of the adjacent hanger grids.

Yet another aspect or embodiment of the present invention relates to method of assembling a composite hanger grid for supporting splash bars in a cooling tower, the method comprising:

(a) providing a plurality of suspension members to form vertical suspension members of the hanger grid when the hanger grid is hung vertically, each suspension member having a longitudinal axis and a continuous length extending at least to the bottom of the hanger grid when the hanger grid is hung vertically;

(b) providing a plurality of beams to form vertically aligned horizontal beams when the hanger grid is hung vertically, the horizontal beams being separate components from the vertical suspension members, each horizontal beam when the hanger grid is hung vertically having a first end, a second end, a bottom, a length, and at least one upper surface portion being capable of supporting a splash bar;

(c) threading the suspension members through holes extending substantially perpendicularly through the horizontal beams from the upper surfaces at two or more spaced locations along the length of the horizontal beams;

(d) providing below each horizontal beam a structure associated with and at one of any variable locations along the length of the suspension members by which the horizontal beams are supported in tension by the suspension members when the hanger grid is hung vertically, whereby the vertical suspension members and the horizontal beams form a grid of a plurality of windows defined by the vertical suspension members and the horizontal beams.

Another aspect or embodiment of the present invention relates to a method of assembling an evaporative cooler fill assembly supported within a fill section in a cooling tower, the method comprising:

(a) providing a plurality of composite hanger grids, each composite hanger grid being supported on one of a plurality of parallel horizontal structural support members within the fill section of the cooling tower to hang a plurality of the hanger grids substantially parallel to each other, the composite hanger grids being capable of supporting splash bars, wherein each splash bar has a first side edge and a second side edge, the hanger grid comprising:

a plurality of vertical suspension members, each suspension member having a longitudinal axis and a continuous length extending at least to the bottom of the hanger grid;

a plurality of vertically aligned horizontal beams as separate components from the vertical suspension members, each horizontal beam having a first end, a second end, a front, a back, a bottom, a length, and at least one upper surface portion, each upper surface portion being capable of supporting a splash bar, all of the vertical suspension members extending substantially perpendicularly through the horizontal beams at two or more spaced locations along the length of the horizontal beams;

each horizontal beam being supported by a structure associated with and at one of any variable locations along the length of the suspension members by which the horizontal beams are supported in tension by the suspension members, whereby the suspension members and the horizontal beams form a grid of a plurality of windows having a height and a width defined by the suspension, members and the horizontal beams, the plurality of windows of one hanger grid being within the fill section of the cooling tower aligned with the plurality of windows of vertically parallel adjacent hanger grids such that the splash bars can be supported generally perpendicularly within the assembly by the horizontal beams of the adjacent hanger grids;

wherein the horizontal beams have generally central unitary retention members approximately midway between the vertical suspension members defining sides of the windows and extending above the upper surface portion, the generally central unitary retention member being capable of retaining a splash bar against lateral movement within the window and wherein the generally central unitary retention members have a lower bearing surface capable of retaining the first side edge of a splash bar seated on the upper surface portion of the horizontal beam against being vertically dislodged within the window;

the horizontal beams having unitary locking portions extending above the upper surface portions at the second end and at other, intermediate locations along the length of the horizontal beam through which the vertical suspension members extend, each of the locking portions having a unitary extension perpendicular to the front and back of the horizontal beam, where adjacent unitary extensions perpendicular to the front and back of the horizontal beam face in opposite directions with respect to the front and back of the horizontal beam, each of the unitary extensions having a projection extending from a lower surface of the extensions;

(b) providing the splash bars to be inserted into the plurality of hanger grids, the splash bars further having an elongated shape with a longitudinal axis, a top, a bottom, a first end, a second end, a length and a width, the first side edge being free of openings extending to the first side edge such that the splash bar is capable of freely sliding on the horizontal beams generally perpendicular through aligned windows of the plurality of parallel hanger grids, the second side edge having a plurality of elongated slots spaced parallel to and longitudinally along the second side edge adjacent to locations where vertical suspension members of the windows of adjacent, parallel hanger grids are located, the elongated slots extending to the second side edge, the splash bar further comprising locking structures equally spaced from, on opposite front and back sides of and longitudinally aligned with the elongated slots;

(c) sliding a first splash bar along its first side edge onto an upper surface portion of the horizontal beams on one side of and adjacent the lower bearing surface of the generally central retainer members into aligned windows of the plurality of hanger grids until the elongated slots on the second side edge of the first splash bar aligns with vertical suspension members of the parallel hanger grids;

(d) laying the first splash bar flat on the horizontal beams with the elongated slots along the second side edge aligned with the vertical suspension members and with the first side edge adjacent to the generally central retention member to retain the first splash bar against lateral movement within the windows, the first side edge of the first splash bar being underneath the lower bearing surface of the generally central retainer member to retain the first side edge of the first splash bar seated on one of the upper surface portions of the horizontal beams against being vertically dislodged within the windows; and (e)(1) pushing or pulling the first splash bar as appropriate along the longitudinal axis of the first splash bar to align and interlock a plurality of the locking structures on one side of the elongated slot along the second edge of the of the first splash bar with a plurality of aligned projections extending from the lower surface of the unitary extensions perpendicular to the front or back of the horizontal beam of the locking portions of the horizontal beams through which the aligned vertical suspension member extends, such that the projections interlock with the locking structures on the first splash bar to retain the first splash bar against longitudinal dislodgement in the windows and to retain the second side edge of the first splash bar seated on the upper surface portion of the horizontal beams against vertical dislodgement within the windows.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DEFINITIONS

Figure 1:
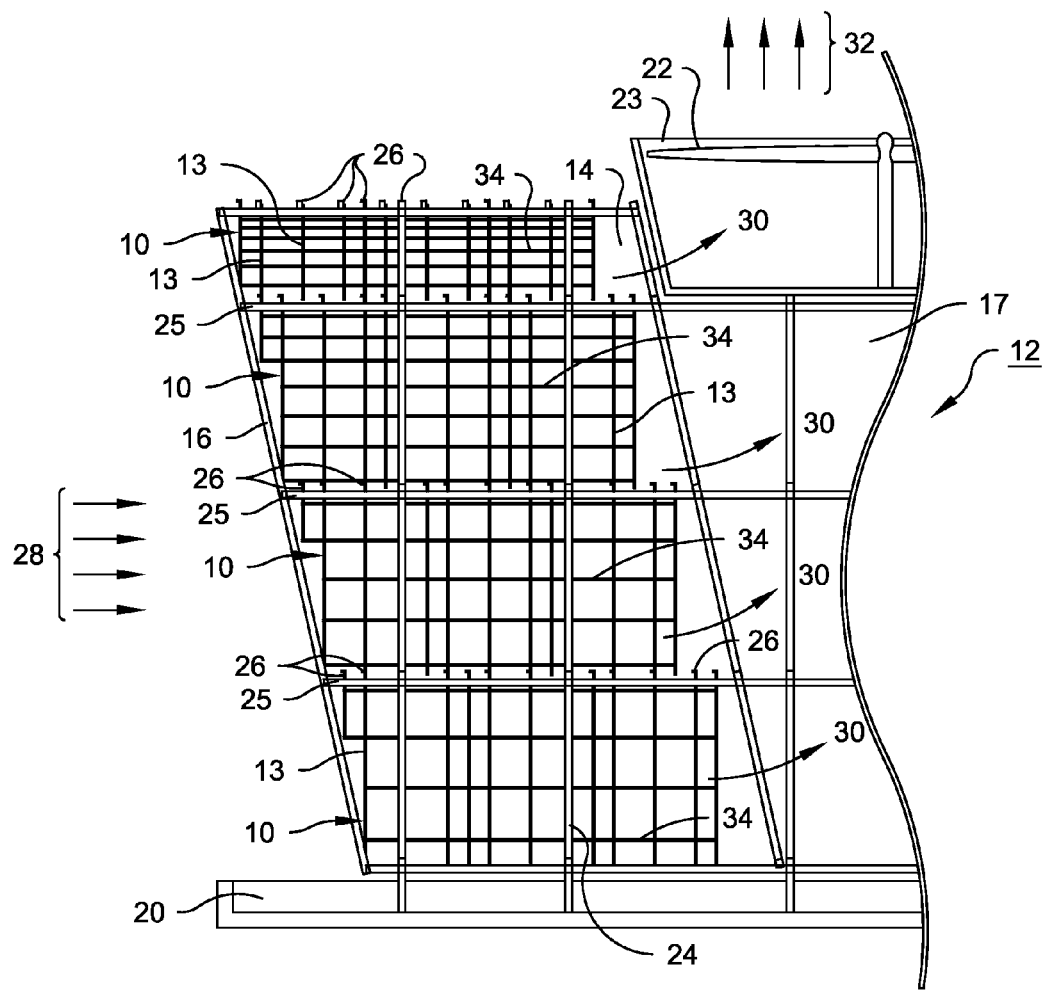
FIG. 1 is a vertical cross-sectional view of a portion of a cross-flow cooling tower showing the arrangement of hanger grids and splash bars according to embodiments of the present invention within the cooling tower.

In addition to the definition of words or terms set forth in other sections hereof, the following definitions will apply to words or terms as used throughout this specification, claims and abstract.

As used herein, the singular forms "a," "an," and "the" include plural referents, and plural forms include the singular referent unless the context clearly dictates otherwise.

As used herein, the term "about," "approximate" or "approximately" with respect to any numerical value or location parameter, means that the numerical value has some reasonable leeway and is not critical to the function or operation of the component being described or the system or subsystem with which the component is used.

Certain directional terminology is used herein for convenience only and is not limiting. Words designating direction such as "bottom," "top," "front," "rear," "left," "right," "sides," "upper" and "lower" designate directions in the drawings to which reference is made, but are not limiting with respect to the orientation in which the invention and its components and apparatus may be used. The terminology includes the words specifically mentioned above, derivatives thereof and words of similar import.

As used herein, the term "generally" or derivatives thereof with respect to any element or parameter means that the value, element or has the basic shape, or the parameter has the same basic direction, orientation or the like to the extent that the function of the element or parameter would not be materially adversely affected by somewhat of a change in the element or parameter. By way of example and not limitation, an element that may be described as "generally perpendicular" to another element can be oriented a few degrees more or less than exactly 90° with respect to absolutely perpendicular, where such variations do not materially adversely affect the function of the related elements or assembly containing them.

As used herein, the term "substantially" with respect to any numerical value or description of any element or parameter means more precisely the value or description of the element or parameter than "generally," but within reasonable variations of industrial manufacturing tolerances that would not adversely affect the function of the element or parameter or apparatus containing it. By way of example and not limitation, when the vertical wires are "substantially equally spaced along length of the horizontal beam," if the vertical wires are sufficiently equally spaced to balance the horizontal beam in a horizontal position, even if the wires are not exactly evenly spaced or if the beam is not exactly horizontal, so long as the function of the hanger grid having slightly unevenly spaced vertical wires or slightly less than horizontal beams is not adversely affected, then the hanger grid would be considered to perform its splash bar support function adequately.

As used herein, the term "unitary" or "unitarily" or derivatives thereof, with respect to one element or component with respect to another element or component, means that the one element or component is formed as a single, unitary, integrated element or component from the same material as the second element or component, and not as a separate attachment. By way of example and not limitation, "unitary" retention members or "unitary" locking portions on the horizontal beam component of the hanger grid are formed of the same material and with, as integrated portions of the horizontal beam component and not as separately attached members or elements.

DETAILED DESCRIPTION OF PREFERRED EMBODIMENTS OF THE INVENTION

Figure 1A:
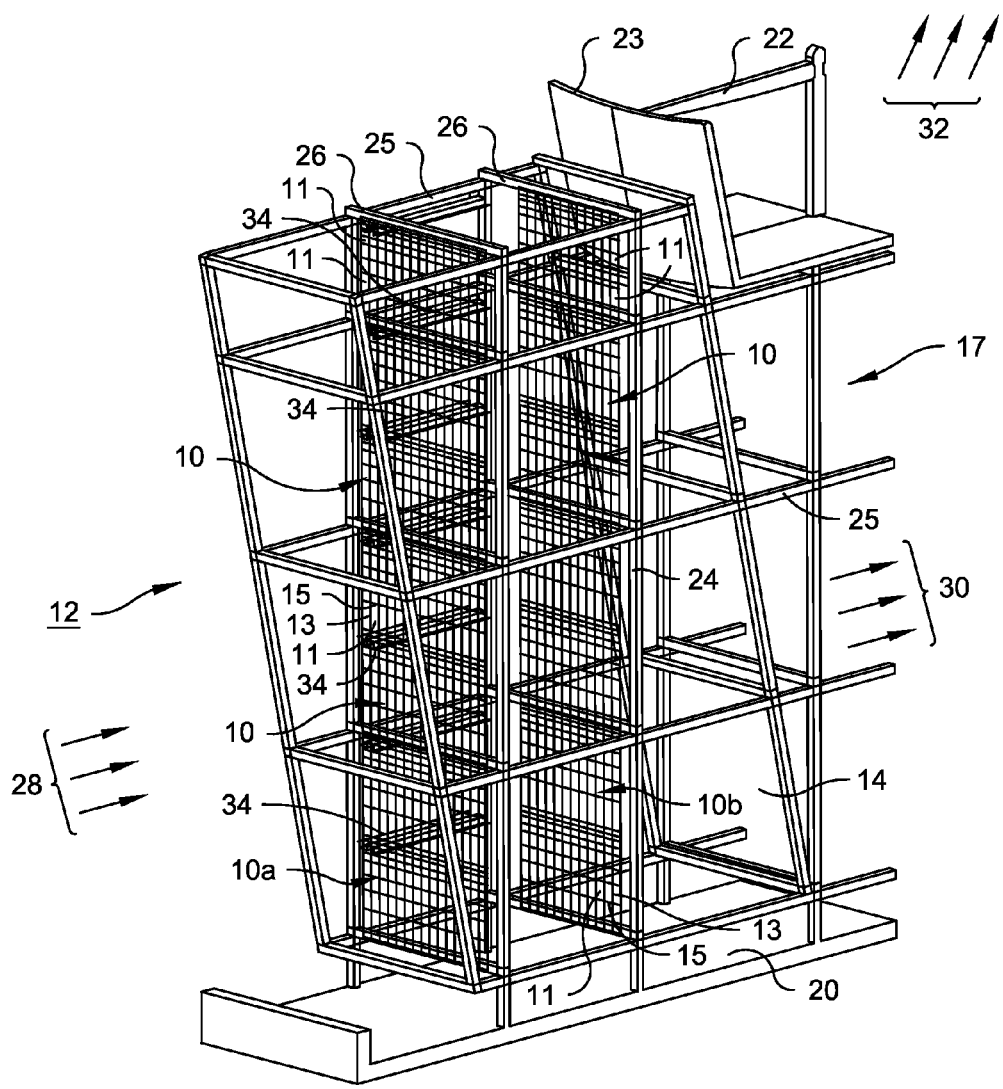
FIG. 1A is an isometric view of a portion of the cross-flow cooling tower of FIG. 1, with certain parts of the cooling tower removed for clarity in illustrating the hanger grids and splash bars according to embodiments of the present invention.

FIGS. 1 and 1A show various typical arrangements of hanger grids 10 according to embodiments of the present invention within schematic representations of a typical cross-flow cooling tower 12. The hanger grids, splash bars and assemblies thereof could be used as an evaporative cooler fill in any type of cooling tower, such as a concurrent, counter-current or cross-flow cooling tower, and are typically most often used in cross-flow cooling towers such as cooling tower 12.

The cross-flow cooling tower 12 has a pair of fill sections 14, only one of which is shown, adjacent to a central plenum 17. The hanger grids 10 are arranged in any desired configuration within the fill section 14, such as side to side of the fill section 14 or the cooling tower 12 as shown in FIGS. 1 and 1A, or front to back of the fill section 14 or the cooling tower 12, or at any oblique angle to the front, back or sides of the fill section 14 or cooling tower 12. Air enters the fill section 14 through openings in a side 16 of the cooling tower, which are typically protected by louvers, not shown. In the fill section 14, the air flows across and mixes with water distributed by one or more distributor systems (not shown) including a pump, piping and manifold conduits or basins holding nozzles (not shown) at the top or at intermediate vertical intervals within the fill section 14. When the water flows downward, it is collected in a sump 20 at the bottom of the cooling tower 12 for recycling to the nozzles or other uses. Air is drawn in by a fan 22 at the top of the cooling tower 12 adjacent the air outlet 23 in an induced air circulation system, although air movement can also be provided by a forced draft fan (not shown) or by natural ventilation (also not shown), if desired. The air flow is shown by inlet air direction arrows 28, arrows 30 showing the air leaving the fill section 14 and entering the plenum 17, and outlet air direction arrows 32 showing the air leaving the cooling tower outlet 23.

Figure 2:
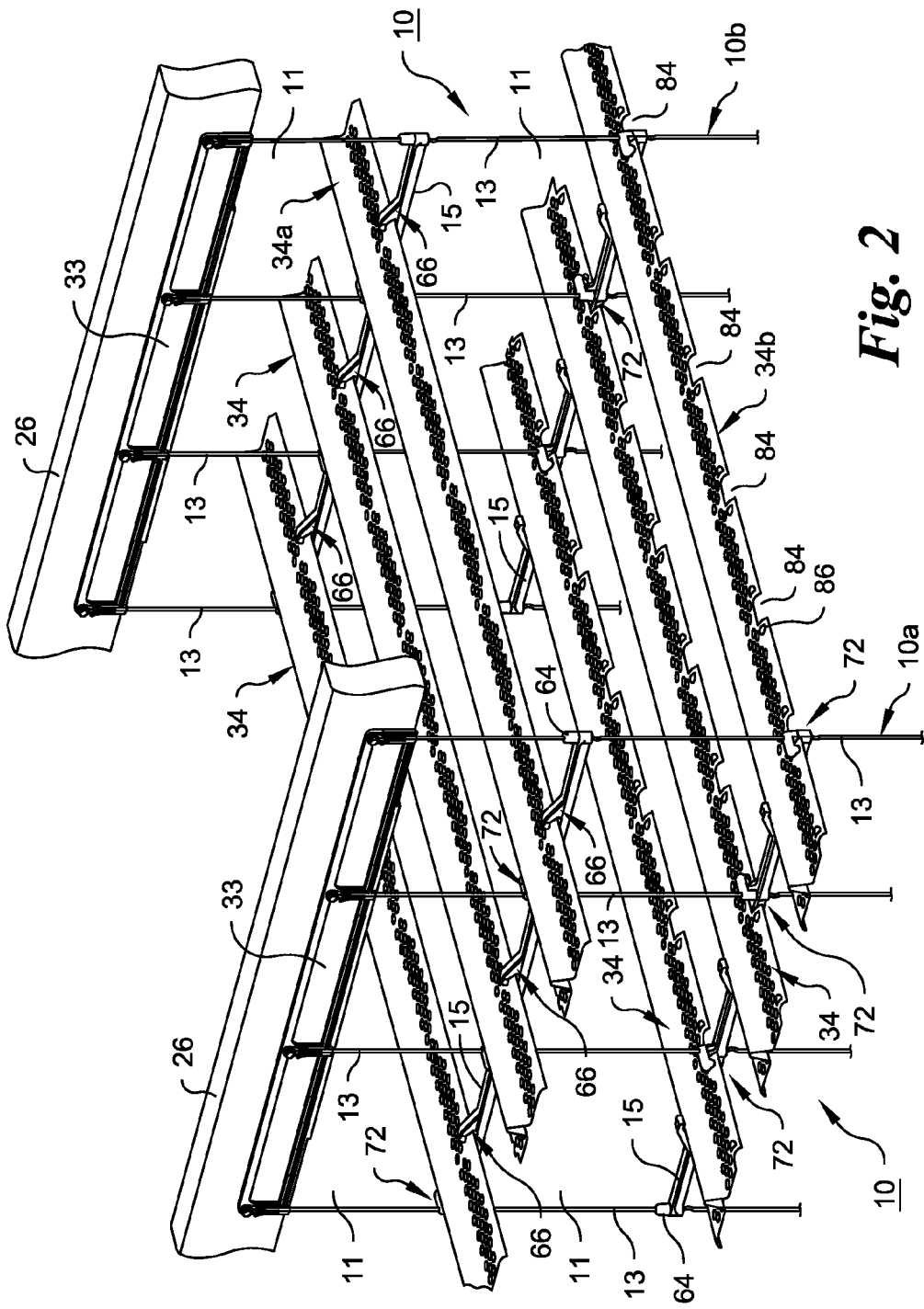
FIG. 2 is an isometric view of an assembly of an evaporative cooler fill assembly using an embodiment of hanger grids and an embodiment of splash bars according to the present invention.

A series of hanger grids 10 may be and preferably are arranged in vertical alignment with each other, one above the other, as shown by four hanger grids 10 in FIGS. 1 and 1A. It is critical, however, as shown in FIGS. 1, 1A and 2, that the series of generally and preferably substantially parallel hanger grids 10, represented by two hanger grids 10a and 10b, be aligned within the fill section 14 such that their windows 11 are aligned side to side and front to back, although the top, bottom and sides of individual hanger grids 10 can overlap or extend beyond one another. The windows 11 are formed by the intersection of vertical members in the form of vertical suspension members 13 in accordance with the present invention, with horizontal members, in the form of horizontal beams 15 in accordance with the present invention, where the horizontal beams 15 are separate components from the vertical members 13. The front to back and side to side alignment of the windows 11 in adjacent hanger grids 10, such as 10a and 10b, is important so that the splash bars 34, supported by the horizontal beams 15, are in proper position and alignment with each other within the fill section 14. The splash bars 34 are shown as horizontal lines extending from side to side through the parallel hanger grids 10 in FIG. 1, in only a few representative locations in FIG. 1A for the sake of clarity, and in all preferred locations in exemplary, but truncated, hanger grids 10 in FIGS. 2 and 3. As shown in FIGS. 1, 1A, 2 and 3, the splash bars 34 are supported generally and preferably substantially perpendicular to the windows 11 of the hanger grids 10. In this manner, there is minimal, and preferably substantially no torque or misalignment of the splash bars 34 that extend generally perpendicularly through the windows 11 of adjacent hanger grids 10. The spacing between adjacent aligned hanger grids can be any desired spacing sufficient to support the splash bars 34. Spacing the hanger grids 10 about 2 feet (about 61 cm) from each other front to back in a cooling tower is an accepted industry standard and is therefore preferred for spacing hanger grids 10 of the present invention. However, horizontal or lateral spacing of any other desired distance is suitable, so long as the splash bars 34 are sufficiently supported in the cooling tower within in the cooler fill formed by the hanger grids 10 and splash bars 34.

The hanger grids 10 are supported on a support structure in the cooling tower such as by vertical grid structural support members 24 that support transverse grid structural support members 25 and horizontal grid structural support members 26, best seen in FIGS. 1 and 1A. As shown in FIG. 2, the hanger grids 10 are attached to the horizontal grid structural support members 26. To help assure proper horizontal alignment when supported on the horizontal grid structural support members 26, the vertical suspension members 13 preferably are retained in a top bracket 33, one embodiment of which is shown in FIG. 2. This and another top bracket embodiment 35 will be described in detail below.

Figure 13:
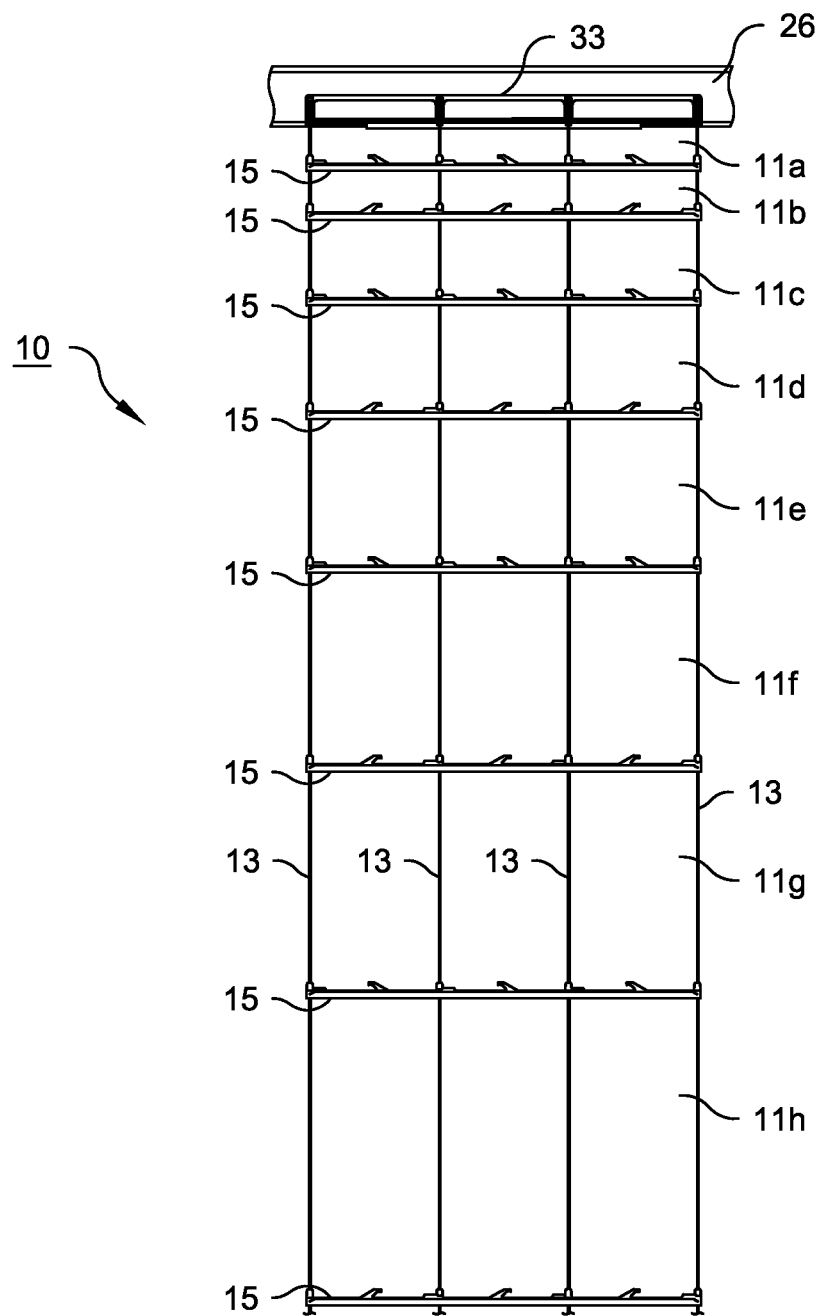
FIG. 13 is a front elevation view of a hanger grid having variably vertically spaced horizontal beams according to an embodiment of the present invention.

Details of embodiments of the composite hanger grid 10 according to the present invention are shown in FIGS. 2-5 and 13, with FIG. 13 showing a preferred embodiment where the windows 11a-11h have variable heights incrementally increasing from the top toward the bottom of the hanger grid 10, although the height of the windows, as well as their width, can be the same or different in all levels or on different levels of any given hanger grid 10, as desired for any particular cooling tower application. For example, the windows 11 may have variable heights incrementally decreasing from the top toward the bottom of the hanger grid. Any incremental increase or decease in height of the windows 11 may be by the same or different distances. The construction of the hanger grid 10 of the present invention makes it easy to form windows 11 of any given height that may be the same or different at different vertical levels as desired.

In its most basic form, the hanger grid 10 of the present invention comprises a plurality of vertical suspension members 13, horizontal beams 15 that are separate components from the vertical suspension members 13, and support structures associated with and located at one of any of variable locations along the length of the vertical suspension members 13, by which the horizontal beams 15 are supported in tension by the suspension members. This configuration transfers all of the operational loads imposed on the splash bars 34 to the horizontal beams 15, which then transfer the load to the vertical suspension members 13. Since all of the horizontal beams 15 are independent of each other and separate components from the vertical suspension members 13, the horizontal beams 15 will be loaded equally throughout the entire hanger grid 10.

The hanger grid 10 comprises a plurality of vertical suspension members 13, each vertical suspension member having a longitudinal axis and a continuous length extending at least to a bottom of the hanger grid 10. If desired, the vertical suspension members may be longer than the bottom horizontal beam 15 of the hanger grid to allow the bottom of the vertical suspension members to be secured within the fill section of a cooling tower. The vertical suspension members 13 must be strong enough to support the weight of the horizontal beams 15 and any other components of the hanger grid 10, the splash bars 34, and any external load, including water and ice, in view of the force and direction of air moving through the hanger grids 10 and splash bars 34 under all foreseeable environmental and operational conditions.

Various materials can be used successfully for the vertical suspension members 13, so long as the material used has the strength, including the tensile strength, to support the anticipated load, is durable and resistant to degradation in the operating environment of the cooling towers, and substantially resists creep. The vertical suspension members 13 must support the horizontal beams 15 and the splash bars 34 in turn supported by the horizontal beams 15, so that the horizontal beam 15 and the splash bars 34 do not appreciably change position along the continuous length of the vertical suspension members 13, during all anticipated environmental and operating conditions within the cooling tower. With these required characteristics, exemplary materials, without limitation, for use as vertical suspension members 13, include metals, such as stainless steel and titanium, or synthetic materials, such as Kevlar® aramid fibers, fiber reinforced plastic, also called fiber reinforced polymers (known in the industry as "FRP"), and the like. The fibers of FRPs are usually glass, carbon, basalt or aramid, among others, and the polymer is usually an epoxy, vinyl ester or polyester thermosetting plastic, among others. The materials for the vertical suspension members 13 may be used as wires or strands, yarns, cables or ropes that may be twisted or braided, or in other forms having a continuous length from at least the top to at least the bottom of the hanger grid 10.

The presently preferred material for the vertical suspension members 13 is stainless steel in the form of wires due to the tensile strength, workability, weight, cost and especially its property of being able, like some other non-brittle metal and some polymeric materials having a high melting point, of being deformed such as by work hardening, also known as strain hardening. Deformations formed by work hardening are strain hardened, such that the deformations resist returning to their original shape and are actually stronger than their original shape. In view of this preference, throughout this written description, instead of the more generic and cumbersome term "vertical suspension members" the term "vertical wire" will be used, without limitation as to the materials or form but having the indicated required characteristics, to refer to the vertical suspension members 13 for use in the hanger grids 10 of the present invention. The vertical wires can have any desired diameter so long as their strength and other required characteristics are present, all which will be determined based on the size of the hanger grid, the materials used to make it and the anticipated load to which it is expected to be subject during operating conditions in the environment in which it and the cooling tower 12 is to be used. Preferably the vertical wires 13 are grade 304L stainless steel having any suitable diameter, such as about 0.0625 inch (about 1.5875 mm) to about 0.187 inch (about 4.75 mm), preferably about 0.086 inch (about 2.184 mm) to about 0.126 inch (about 3.2 mm), and most preferably about 0.086 inch (about 2.184 mm). Testing and modeling of hanger grids 10 of various heights and widths at loads considerably in excess of anticipated capacity of the hanger grids 10, splash bars 34, water and ice loads have shown that this stainless steel material having this range of diameters is excellent for the vertical suspension members 13 of the hanger grids 10.

As shown in FIGS. 2, 3 and 9-12, the vertical wires 13 are preferably supported at their upper ends by eyelets 36 formed by loops of the wire. While it is not essential, the loops are preferably welded to resist opening, although twisting the end of the wire about itself and clamping the wire to retain the loops would also generally be acceptable, as is even loops not secured together with the appropriate material of appropriate diameter and deformability used for the vertical wire 13. Each individual wire 13 with its eyelet 36 can be attached separately to a horizontal grid structural support member 26 within the fill section of a cooling tower by fasteners such as nails or screws. However, this requires precise measurement and great care in installation. It is therefore preferable that the top portions of the vertical wires 13, including the eyelet 36 and a short vertical downward extension below the eyelet are retained in a top bracket, such as a top bracket 33 (shown in FIGS. 2, 3, 11 and 12) or a top bracket 35 (shown in FIGS. 9 and 10) that more readily aligns the hanger grid 10 with a horizontal grid structural support member 26 within the cooling tower. The top brackets 33 and 35 can be injection molded from any number of suitable synthetic polymeric plastic materials, such as those described below with reference to the preferred material used to form the horizontal beams 15 of the hanger grids 10.

Preferably, the top portion of the vertical wires 13, including the eyelet 36 and a short vertical downward extension below the eyelet are retained in a plastic wire retainer 38 preferably unitarily formed with vertical members 39 of the top bracket 33 connecting upper horizontal member 40 to lower horizontal member 42 of the top bracket 33, or in a wire retainer 38 preferably unitarily formed with the top bracket 35 in areas reinforced by diagonal members 41. The top brackets 33 and 35 thus appropriately retain the tops of the vertical wires 13 in proper horizontal spacing to be in precise vertical alignment with the locations where the vertical wires 13 pass through the horizontal beams 15 of the hanger grid 10. The tops of the vertical wires 13 can vary in elevation to alleviate the potential for splitting the generally grain-based horizontal grid structural support member 26, such as wood or FRP. Splitting is not a concern where the horizontal grid structural support members 26 are made of metal, or other material which is not likely to split. Although the horizontal grid structural support members 26 are schematically shown as solid beams in FIGS. 2 and 9-12, the horizontal grid structural support members 26 could be any other shape, such as a "C" shape popular in the industry, which can be made by extruding or pultruding various materials, including metals.

In the embodiment shown in FIGS. 2, 3, 11 and 12, the top bracket 33 has a bottom horizontal flange 46 capable of aligning the top bracket 33 with a bottom 29 of a horizontal grid structural support member 26 within a cooling tower to support the hanger grid within the cooling tower. In other embodiments of the top bracket, such as the top bracket 35 shown in FIGS. 9 and 10, one or more top horizontal flanges 45 align with and are supported by the top 27 of a horizontal grid structural support member 26. As noted above, in certain circumstances, problems may and do result in hanging hanger grids by top brackets registered and aligned with or supported by the top 27 of a horizontal grid structural support member or beam 26. The problems often are caused by different beam sizing for major and minor structural support beams for the hanger grids (e.g., structural support beams having different heights, such as 2 inches by 4 inches compared to 2 inches by 6 or 8 inches), which causes the top elevation not to have uniform heights within the cooling tower, requiring measurement for exact placement of a hanger grid. To overcome this potential problem with top brackets such as top bracket 35 supported on the top 27 of the horizontal grid structural support member 26, in accordance with a preferred embodiment of the present invention, a top bracket such as the top bracket 33 having a lower horizontal flange 44 is used, so as to register and align the top bracket 33 with the bottom 29 of the horizontal grid structural support member 26.

The upper, preferably welded eyelets 36 are positioned in the top bracket 33 at spaced locations along the length of the top bracket corresponding to spaced locations of the wires through and along the length of the horizontal beams 15, the eyelets being capable of receiving fasteners 46 and of supporting the hanger grid 10 within the cooling tower 12. The fasteners 46 may be nails, wood screws or metal screws with appropriate washers, lock washers and nuts. The most common type of fasteners used in the industry is Tek® screws, a type of self-tapping screw with a wide hex head. The hanger grid 10 preferably uses these types of fasteners in both wood and composite grid structural support members.

In addition to a plurality of vertical metal wires 13, the hanger grids 10 of all embodiments of the present invention also include at least two vertically aligned horizontal beams 15 as separate components from the vertical wires 13. The vertical wires 13 and the horizontal beams 15 form a grid of a plurality of windows 11 defined by the vertical wires 13 and the horizontal beams 15. The separate horizontal beams 15 may be made of any suitable material, such as metal, preferably stainless steel, or even wood, although a synthetic polymer (described in detail below) is preferred, and may have any desired cross-sectional shape. For metal horizontal beams 15, the beams may be solid formed by punching or machining, or preferably tubular of any cross-sectional shape, including round, but a rectangular or square cross-sectional shape is preferred and may be readily produced by extrusion techniques. Metal or wooden horizontal beams 15 are best used with clips or other structures to retain the splash bars 34 in appropriate positions on an upper surface 58 of the horizontal beams. The use of stamped or machined metal or extruded or injection molded synthetic polymeric horizontal beams 15 is preferred for the hanger grid 10 of the present invention, since splash bar alignment and retention features may be and preferably are unitarily formed with and as part of the horizontal beam 15. Such alignment and retention features are described below primarily with respect to synthetic polymeric horizontal beams, since it may be easier and more precise to make horizontal beams of the desired shape and features using synthetic plastic material, particularly by injection molding, but skilled metalworkers could readily make suitable stamped metal horizontal beams 15 having the desired stamped profile and then bending or folding portions of the metal profile to produce the indicated alignment and retention features.

The horizontal beams 15 may be of any length so long as it can support at least one, but preferably two or more splash bars and at least two vertical wires 13 pass through holes 60 formed at least adjacent the ends of the horizontal beams, and preferably at spaced and more preferably, evenly spaced locations intermediate the ends of the horizontal beam 15. To form a hanger grid of greater width than the length of the horizontal beams, the horizontal beams can be supported by vertical wire 13 that are very close to each other, such that the ends of the horizontal beams 15 abut or nearly abut each other. Alternatively, when using short horizontal beams to extend the width of the hanger grid 10, the short horizontal beams may be overlapped at their ends, such that a first end of a horizontal beam is on top of or below the second end of a horizontally adjacent beam. This structure could be accomplished by passing one vertical wire 13 though stacked ends of adjacent horizontal beams 15. It is preferred, however, that the length of the horizontal beam 15 be equal to the width of the hanger grid 10 so that the use of additional closely-spaced vertical wires 13 or the vertical stacking of ends of the horizontally adjacent horizontal beams 15 can be avoided.

Especially in its presently most preferred embodiment, the composite hanger grid 10 of the present invention combines and further enhances the advantages of steel wire hanger grids with the advantages of injection molded plastic hanger grids, while overcoming the disadvantages of both steel wire hanger grids and injection molded plastic hanger grids. The composite hanger grid 10 utilizes the strength of stainless steel or other material with equivalent tensile strength and other required properties as noted above as the presently preferred vertical suspension members 13 of the hanger grid, while using separate horizontal beams 15, in the presently preferred embodiment made of synthetic polymeric plastic that can be extruded or preferably injection molded. The horizontal beams 15 preferably contain unitarily formed retention members and locking portions, that even under severe environmental and cooling tower operating conditions, retain the splash bars 34 against lateral and longitudinal dislodgement in the windows 11 and retain the splash bars 34 on upper support surface portions of the horizontal beam members 15 against vertical dislodgement in the windows 11.

Figure 3:
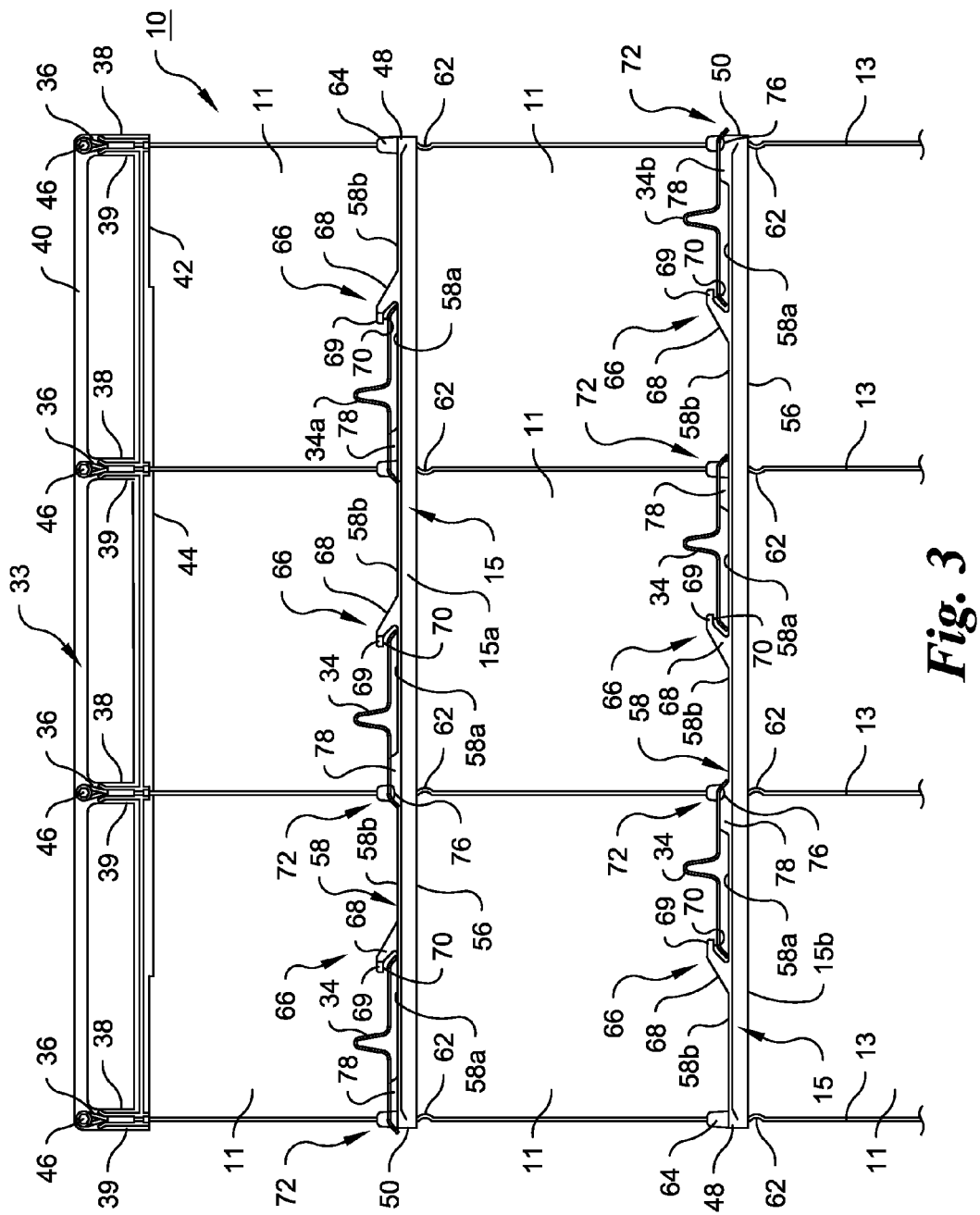
FIG. 3 is a front elevation view of a portion of a hanger grid according to an embodiment of the present invention.
Figure 4:
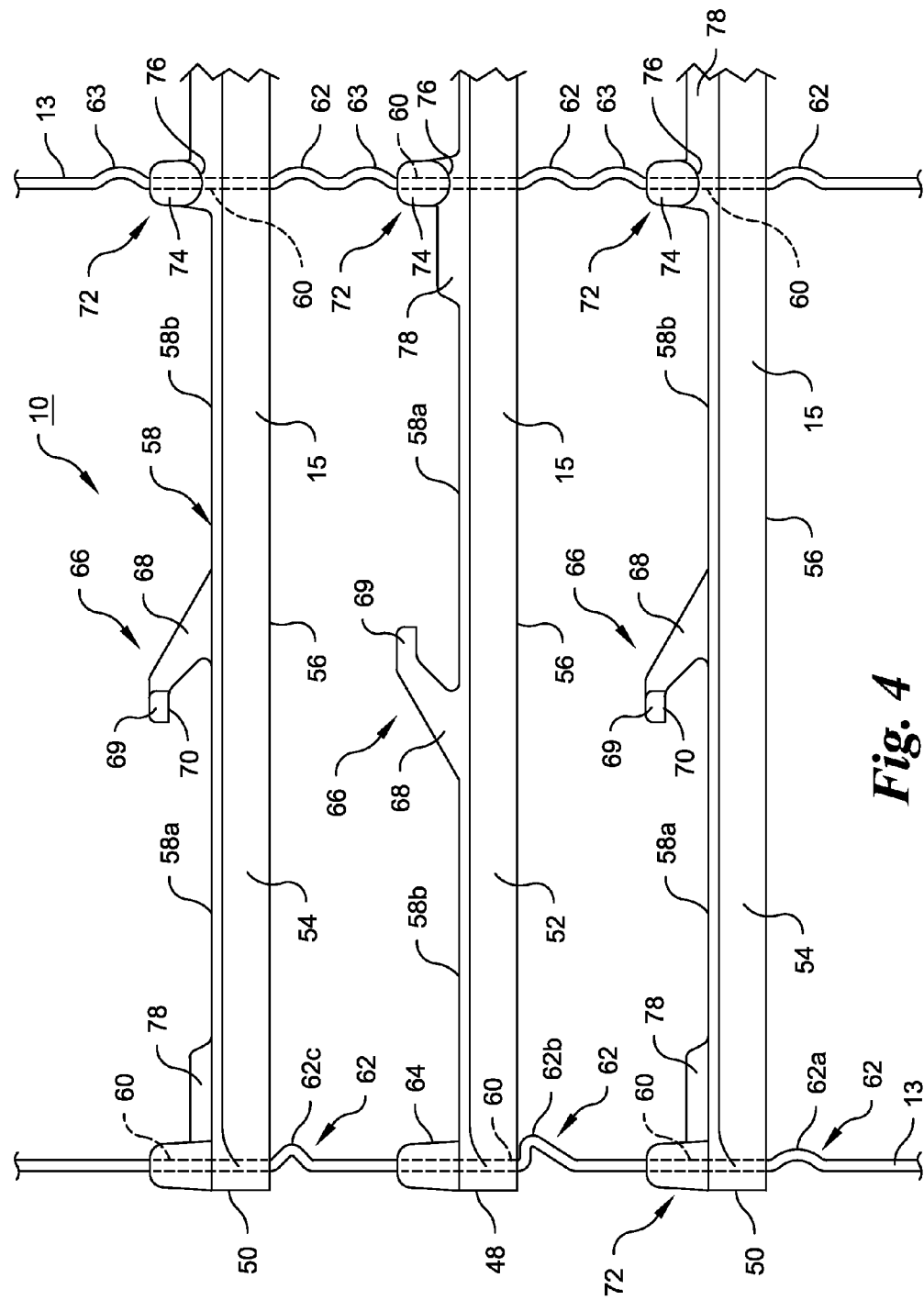
FIG. 4 is an enlarged front elevation view of portion of a hanger grid according to an embodiment of the present invention showing different types of deformations in a wire capable of supporting separate horizontal beams in the hanger grid.
Figure 5:
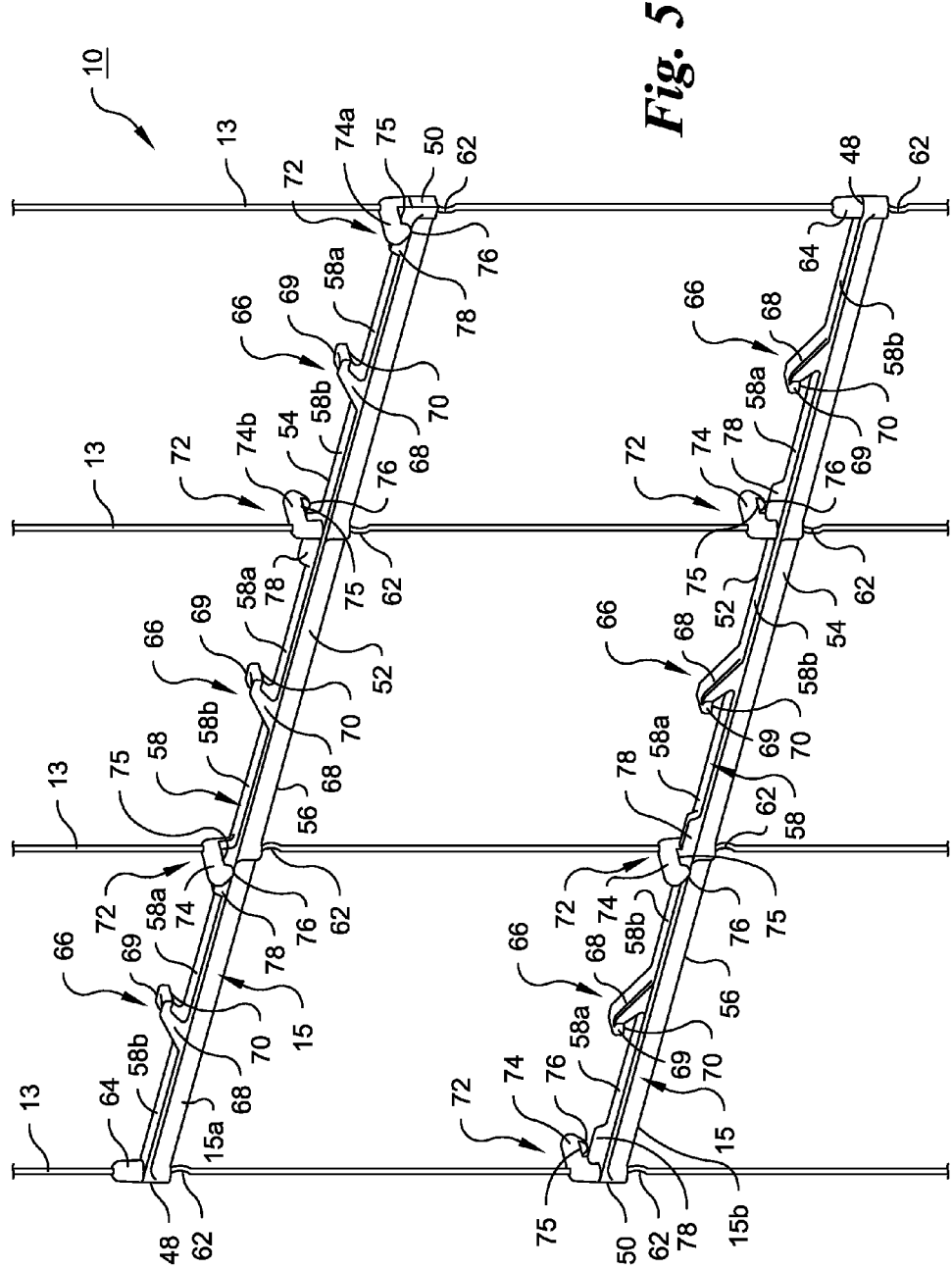
FIG. 5 is an enlarged isometric view of portion of a hanger grid according to an embodiment of the present invention.

Details of preferred embodiments of the horizontal beams 15 extruded or preferably injection molded using a synthetic polymer as discussed below are best shown in FIGS. 3-5. Each horizontal beam 15 used in the hanger grid preferably has the same structure to avoid having to make horizontal beams of different structures, although horizontal beams having different structures could be used, so long as the basic structure is provided to be supported by the vertical wires 13 and to appropriately support the splash bars 34 within the cooling tower. The basic structure of a horizontal beam 15 includes a first end 48, a second end 50, a bottom 56, and an upper surface 58, which may comprise one, and preferably two (or more) portions 58a and 58b, where each upper surface portion 58a and 58b is capable of supporting a splash bar 34. Although the cross-section of the horizontal beam 15 could be round, it preferably is not, such that the horizontal beam 15 also has a front 52 and a back 54. The upper surface 58 is preferably flat and unitarily formed with the front 52 and back 54 of the horizontal beam 15, such that a transverse cross-section through the horizontal beam 15 preferably is in the shape of a "T" that provides excellent structural rigidity for the horizontal beam in all directions. The length of the horizontal beam 15 preferably defines the width of the hanger grid 10.

As shown in FIGS. 2-5 and 13, the horizontal beams 15 having the same structure described in detail below at each successively lower vertical level within the hanger grid 10 are oriented 180° with respect to each other, such that the first end 48 of one horizontal beam is spaced along the vertical wires 13 and located under the second end 50 of a vertically adjacent horizontal beam. With the preferred shape of the horizontal beam, as described in more detail below, the splash bars 34 may be retained in the windows 11 of the hanger grid 10 in a staggered relationship, best seen in FIGS. 2 and 3. Thus, the splash bars 34, such as splash bar 34a in the right-hand windows 11 of FIGS. 2 and 3, on one vertical level are located on an upper surface portion 58a on half of the width of a window 11 such that they are staggered horizontally and vertically from the splash bars 34, such as splash bar 34b in the right-hand windows 11 of FIGS. 2 and 3, on an upper surface portion 58b of adjacent upper or lower levels within the hanger grid 10 to assure that water being distributed in the fill including the splash bars impacts all of the splash bars for most effective evaporative heat exchange.

The horizontal beams 15 formed of synthetic polymeric plastic material can be formed by extrusion and then machined to the appropriate shape to have all of the desired features to support the splash bars 34 as noted herein. Alternatively, and preferably, the horizontal beams are formed by injection molding, since injection molding, while more expensive than extrusion, tends to be less expensive overall to produce the horizontal beams with all of the desired features, since little or no machining of the injection molded beam is required.

Any synthetic polymeric plastic material may be used to make the horizontal beams 15, so long as the material is capable of providing the strength, moldability, shape retention and durability at operating conditions required for any given environment. Typical suitable synthetic polymers are polypropylene, polyvinyl chloride, nylon 66 polyamide, and glass-filled nylon 66 polyamide. Of these and other similar materials, the glass-filled nylon 66 is preferred in view of its high strength, high service temperature including high glass transition temperature that resists creep, and its moldability in injection molding operations.

All of the vertical wires 13 extend substantially perpendicularly through the horizontal beams 15 by passing through vertically aligned holes 60 at spaced locations that are preferably substantially evenly spaced along the length of each of the horizontal beams 15. Hole 60 must be located at least adjacent to the first end 48 and the second end 50 and can be formed during the injection molding process or subsequently by drilling. The holes 60 through which the vertical wires 13 are threaded have a slightly greater diameter than the diameter of the vertical wires 13. The diameter of the holes should be such that it is not difficult to thread the wires through the holes, but not so great as to allow the horizontal beams to readily slip down the wires or to be degraded by a support structure associated with the wires for supporting the horizontal beams. Holes 60 having an exemplary, non-limiting diameter of about 0.025 inch (about 0.635 mm) greater than the diameter of the vertical wire 13 passing through the holes provide sufficient ease of threading and sufficient retention capability.

Each horizontal beam 15 is supported at one of any variable locations along the continuous length of the vertical suspension members 13 by a structure associated with the vertical suspension members. Thus, the horizontal beams 15, as well as any splash bars 34 carried by the horizontal beams, together with any additional load on the splash bars, horizontal beams or the hanger grid, are supported in tension directly by the vertical suspension members 13. The structure associated with the vertical suspension members 13 to support the horizontal beams 15 at the desired location along the length of the vertical suspension members may be any structure that bears against the bottom 56 of the horizontal beams to transfer the load on the horizontal beams to the vertical suspension members. Non-limiting exemplary structures suitable for this purpose include collars that can be locked or otherwise firmly clamped in place on the vertical suspension members, such as by one or more set screws, welded washers, nibs applied to the vertical suspension members by welding or suitably strong adhesive, such as epoxy, or the like. All of these exemplary mentioned support structures associated with the vertical suspension members require additional components to be added to the vertical suspension members, with additional material cost, and relatively labor-intensive installation, so they are less preferred.

A more preferred structure associated with the vertical suspension members 13 is a deformation 62 formed directly in each vertical suspension member 13 at the desired location under the bottom 56 of the horizontal beams 15, when the vertical suspension member 13 is made of a material that is capable of being deformed without sacrificing the strength of the suspension member necessary to support the horizontal beams 15, splash bars 34 and any other load on them or the hanger grid 10. Especially in the presently preferred embodiment of the vertical suspension members 13 as metal, and most preferably stainless steel wires, the deformations 62 are formed by cold (room temperature) deformation, since cold deformation of stainless steel strain hardens the deformations 62. Other non-brittle metals and polymers with a high melting point can be deformed in this manner to produce the desired deformation 62 at any one of the almost infinitely variable locations along the continuous length of the vertical suspension member 13. The deformations 62 may be formed such as by crimping with any suitable crimping tool in the nature of pliers with jaws that may have any desired shape to form crimped deformations 62 sufficient to support the horizontal beams 15 and associated loads without having the horizontal beams slip over the deformations.

FIG. 4 illustrates non-limiting exemplary shapes of deformations 62 in a vertical wire 13 passing through holes 60 in three vertical levels of horizontal beams 15 on the left hand side of FIG. 4, while the right hand side of FIG. 4 shows crimped deformations 62 all having the same shape in a wire 13. Crimped deformation 62a is in the form of a rounded deformation. Crimped deformation 62b is in the form of a crimp having an angle of about 90° adjacent the bottom 56 of the horizontal beam with respect to the longitudinal axis of the wire 13. Crimped deformation 62c is in the form of a crimp having an angle of about 45° adjacent the bottom 56 of the horizontal beam 15 with respect to the longitudinal axis of the wire 13. Preferably, as best seen in FIG. 3, the deformations 62 in the vertical wires 13 passing through the first end 48 and the second end 50 of the horizontal beams 15 face in opposite directions toward the center of the horizontal beam to help balance any torque that may be applied to the horizontal beam as the bottom 56 of the horizontal beam rests on and bears against the deformations 62. The direction of the other deformations in the vertical wires 13 intermediate to the ends 48 and 50 of the horizontal beams 15 may also help balance the torque on the horizontal beams. The shape and direction of the deformations 62, especially in the vertical wires 13 at the ends 48 and 50 of the horizontal beams 15 counteract the torque placed on the horizontal beams by the load on the connection of the horizontal beams to the vertical wires 13. The right hand side of FIG. 4 also shows that deformations 63, which may be of any suitable shape, or other structure associated with the vertical wire 13, may be formed in the vertical wire immediately above the horizontal beams 15 to assure that the horizontal beams 15 do not ride up on the vertical wires under operating conditions of the cooling tower 12.

The hanger grids 10 formed as described above may have any desired configuration of height, width, number of windows and size of windows due to the ease of assembling the hanger grid and its two basic components: vertical suspension members 13 and separate horizontal beams 15, where the assembly is especially easy when the vertical suspension members are metal wires and the horizontal beams are synthetic polymeric plastic horizontal beams. Typical dimensions and other parameters of hanger grid configurations are set forth in the following Table 1, where the overall size of the hanger grid 10 is in feet, and the number of horizontal beams is determined for windows 11 having two different preferred approximate and more preferably substantial internal dimensions of 4 inches (10.16 cm) high by 8 inches (20.32 cm) wide and 8 inches (20.3 cm) high by 8 inches (20.3 cm) wide.

TABLE 1

| Grid Config | Grid Width | Grid Height | Grid Spacing | Grid Volume | Number of Horizontal Beams | |
|---|---|---|---|---|---|---|
| (Ft) | (in) | (in) | (in) | (ft³) | 4" × 8" | 8" × 8" |
| 2 × 2 | 24 | 24 | 24 | 8 | 5 | 3 |
| 2 × 4 | 24 | 48 | 24 | 16 | 11 | 6 |
| 2 × 6 | 24 | 72 | 24 | 24 | 17 | 9 |
| 2 × 12 | 24 | 144 | 24 | 48 | 34 | 18 |
| 4 × 2 | 48 | 24 | 24 | 16 | 5 | 3 |
| 4 × 4 | 48 | 48 | 24 | 32 | 11 | 6 |
| 4 × 6 | 48 | 72 | 24 | 48 | 17 | 9 |

It is preferred to have hanger grids 10 with windows 11 having an internal width of 8 inches (20.3 cm), corresponding to a width of two splash bars of typical width, where the width of the splash bars is measured from any indentations, slots or notches in the side edges corresponding to locations of the vertical wires 13, by which the splash bars are retained against longitudinal movement within the windows. In this way, the windows 11 are sufficiently wide to accommodate splash bars 34 on one half of the flat upper surface 58 of the horizontal beam 15, so that splash bars 34 of typical configuration and dimensions can be supported in a staggered vertical and horizontal arrangement on adjacent vertical levels as previously explained, merely by reversing 180° the horizontal beams 15 on adjacent vertical levels, such that the flat upper surface portions 58a of the horizontal beam 15 on one level is vertically aligned with the flat upper surface portions 58b of the horizontal beam 15 on an adjacent level, as best shown in FIGS. 3 and 4, and as also shown in FIG. 13, without the detailed part numbering as in FIGS. 3 and 4. It is also usually easier to install the splash bars in wider windows 11, as less tilting of the splash bars toward one edge is necessary.

A very significant advantage of the composite hanger grid 10 of the present invention is that the height of the entire hanger grid can be adjusted based only on the length of the vertical wires 13 used to make it, limited only by the anticipated load to be placed on the hanger grid. FIGS. 1 and 1A illustrate the use of hanger grids 10 having different overall heights, with the top hanger grid 10 having a height less than the other hanger grids 10 within a cooling tower of any given configuration.

Another very significant advantage of the composite hanger grid 10 of the present invention is the unlimited ability to adjust the height of each row of windows 11 to any desired height to account for the position of the hanger grid 10 in a cooling tower. The window height adjustment is accomplished very easily by merely locating the deformations 62 or other structures that supports the horizontal beams 15 on the vertical wires 13 at the desired position along the length of the vertical wires after the vertical wires are threaded through the holes 60 in the horizontal beams 15, and then forming the deformation 62 or securing the other horizontal beam supporting structure to the vertical wires.

FIG. 1 schematically shows four hanger grids 10 within the cooling tower 12. As determined by the vertical distance between the splash bars 34, which are supported by the horizontal beams of the hanger grids 10, the highest hanger grid 10 has variable height windows, with the height of the windows increasing incrementally from the top to the bottom of the hanger grid 10. The next highest hanger grid 10 also has variable height windows, with the height of the windows increasing incrementally from the top to the bottom of the hanger grid, but the height of the windows of this hanger grid is larger than the height of the windows in the top hanger grid 10. The hanger grid 10 third from the top in FIG. 1 has windows of a uniform height, where the height of the windows is greater than the height of the windows in the two upper hanger grids. The bottom hanger grid 10 in FIG. 1 also has variable height windows, with the height of the windows increasing incrementally from the top toward the bottom of the hanger grid except for the lowermost row of windows, and the height of the windows of this bottom hanger grid, other than for the lowermost row, is larger than the height of the windows in the other hanger grids 10.

FIG. 1A schematically shows two very tall hanger grids 10a and 10b, where the height of the windows 11 in both hanger grids are variable in seven different vertical sections that are aligned in both hanger grids, with the height of the windows 11 increasing incrementally from the top to the bottom within each section.

FIG. 13 is a front elevation view, in more detail than in FIG. 1, of an exemplary hanger grid 10 with variable height windows 11 increasing in height incrementally from the top to the bottom of the hanger grid.

Details of one presently preferred embodiment of a horizontal beam 15 having retaining features for retaining splash bars 34 securely within the windows 11 will now be described primarily with reference to FIGS. 2-5, where FIGS. 3-5 show the greatest detail. In its broadest sense, any type of retaining structures could be used in the hanger grid 10 with respect to the vertical wires 13, the horizontal beams 15, or both the vertical wires 13 and the horizontal beams 15, to retain one or both side edges and/or a portion intermediate the side edges of splash bars 34 against longitudinal, lateral or vertical dislodgement within the windows 11. However, specific structures can be readily and preferably unitarily formed in the horizontal beam 15, and especially a synthetic polymer horizontal beam, to perform these functions.

The horizontal beam 15 preferably has a unitary tubular portion 64 extending above the flat upper surface 58 at the first end 48 of the horizontal beam through which a vertical wire 13 extends, by passing the vertical wire 13 through hole 60 formed in the tubular portion 64. The tubular portion provides reinforcement for the horizontal beam where the vertical wire passes through it and also restricts the lateral movement of a splash bar 34 adjacent to it. If a splash bar has notches in its side edge to be aligned adjacent the tubular portions 64, the tubular portions can also restrict the longitudinal movement of the splash bar. Preferably the tubular portion 64 is cylindrical to reduce wear on any splash bars retained by the tubular portion, and is formed only at the first end 48 to save material and to use a less complicated forming process, such as injection molding, but if desired, similar tubular portions 64 could be formed wherever the vertical wires 13 pass substantially perpendicularly through the horizontal beams 15 and wherever lateral stability of splash bars is required or desired. In the presently preferred embodiment of the horizontal beam 15, the unitary tubular portion 64 is located only at the first end 48 of the horizontal beam 15 in view of the other details of this presently preferred embodiment and how such horizontal beams are arranged in the hanger grid 10.

The preferred synthetic polymeric horizontal beam 15 has a generally and preferably substantially central unitary retention member 66 approximately and preferably substantially midway between the vertical wires 13 defining sides of a window 11. The unitary retention member is capable at least of retaining a first side edge 82 (best shown in FIGS. 6-8) of a splash bar 34 seated on the upper surface 58, such as upper surface portion 58a of the horizontal beam 15 against being dislodged within the window 11, such as against lateral displacement, and preferably against vertical dislodgement. The generally central retention member 66 preferably extends above the upper surface 58 and has a lower bearing surface capable of retaining the first side edge 82 of a splash bar 34 seated on the upper surface portion 58a of the horizontal beam 15 against being vertically dislodged within the window. More specifically, the generally central retention member 66 includes an angled arm 68 extending from the upper surface portion 58a of the horizontal beam 15. An extension 69 is preferably unitarily formed with the angled arm 68 at the terminal end of the angled arm. The extension 69 provides additional surface area for contact with the top of the splash bar 34 and preferably has a length greater than the diameter of any holes formed in the splash bar 34, such as holes 90 (best shown in FIGS. 6-8) that provide the splash bar with perforations to further divide and circulate water being sprayed on or otherwise falling on the splash bars, thereby enhancing evaporative cooling. With a length greater than the diameter of such holes 90, the extension 69 is less likely to be caught in any of the holes 90. The lower bearing surface of the retention member 66 is preferably a lower bearing surface 70 formed under the extension 69 and bears against or is located sufficiently close to the top of the splash bar 34 to retain the first side edge 82 of a splash bar 34 seated on the upper surface portion 58a of the horizontal beam 15 against being vertically dislodged within the window.

The preferred synthetic polymeric horizontal beam 15 has locking unitary portions 72, extending above the upper surface 58, at least at one or more of the second end 50 of the horizontal beam 15, and at other, intermediate locations along the length of the horizontal beam through which the vertical suspension members 13 extend, preferably between where upper surface portions 58a and 58b in adjacent windows meet. Each of the locking portions 72 has a unitary extension 74 perpendicular to the front 52 and back 54 of the horizontal beam 15. When there are two or more unitary locking portions 72 on a horizontal beam 15, adjacent unitary extensions 74 face each other but in opposite directions with respect to the front 52 and back 54 of the horizontal beam. Thus, one such unitary extension 74 extends perpendicularly from the front face 52 and the other unitary extension extends perpendicularly from the rear face 54, and so on for each of the remaining unitary locking portions 72 on the same horizontal beam 15. Each of the unitary extensions 74 have a projection 76 extending from a lower surface 75 of the extension capable of interlocking with a mating locking structure of a splash bar 34 to retain the splash bar against longitudinal dislodgement in the window 11 and to retain the second side edge 83 (best shown in FIGS. 6-8) of the splash bar seated on the upper surface 58, preferably the upper surface portion 58a of the horizontal beam 15 against being vertically dislodged within the window 11. The projection 76 preferably has a straight edge generally and preferably substantially parallel to the front face 52 or the rear face 54 of the horizontal beam, and a bulbous or rounded lower bearing surface.

The upper surface 58 of the preferred synthetic polymeric horizontal beam 15 preferably also has a raised portion 78 extending from the locking portion 72 along the upper surface 58 for a distance sufficient to support an area on the bottom of the second edge 83 of the splash bar 34 near the projection 76 to help retain the projection 76 in an interlocking relationship with the interlocking structure of the splash bar 34.

If desired, the respective locations of the generally central retention members 66 and the locking portions 72 (and any associated raised portion 78) could be reversed along the length of the horizontal beam 15, such that the retention member 66 could be located where the vertical suspension members 13 pass through them and the horizontal beam 15 and the locking portions could be generally or substantially midway between the locations where the vertical suspension members 13 pass through the horizontal beam 15.

Another aspect of the present invention relates to a splash bar 34 particularly adapted for use with a hanger grid 10 of the present invention using the just-described preferred synthetic polymeric horizontal beams 15. There are various embodiments of such a particularly adapted splash bar 34, exemplary embodiments being best shown in FIGS. 6-8.

The splash bar 34 of the present invention is capable of being supported on a horizontal beam such as horizontal beam 15, and retained against dislodgement within windows 11 defined by the horizontal beams 15 and vertical members such as vertical suspension members 13, in a hanger grid such as hanger grid 10. The splash bar 34 has an elongated shape with a longitudinal axis, a top, a bottom, a first end 80, a second end 81, a length and a width, a first side edge 82 and a second side edge 83. The first side edge 82 is free of openings extending to the first side edge such that the splash bar 34 is capable of freely sliding on horizontal beams 15 generally perpendicular through aligned windows 11 of a plurality of parallel hanger grids 10. The splash bar 34 may thus be slid through the windows 11 by only very slightly tilting the splash bar 34 toward the first side edge in an amount only enough so that any notches or slots formed in the second side edge 83 clears the edges of the horizontal beams 15 to permit smooth, unrestricted sliding through the entire fill assembly of the hanger grids 10. The second side edge 83 has a plurality of elongated slots 84 spaced parallel to and longitudinally along the second side edge 83 adjacent to locations where vertical members 13 of the windows of adjacent, parallel hanger grids 10 are located. The elongated slots 84 extend to the second side edge 83 of the splash bar 34. The splash bar 34 further comprises first and second locking structures, such as holes 86 and 88, respectively, equally spaced from, on opposite front and back sides of and longitudinally aligned with the elongated slots 84, such that the splash bar 34 is capable of being retained against longitudinal dislodgement in the windows 11 and the second side edge is capable of being retained on the horizontal beams 15 against vertical dislodgement in the windows 11.

The placement of the locking structures as indicated spaced relationship and on opposite front and back sides of the elongated slot 84 is to allow the same splash bar 34 to be used on adjacent lower and upper vertical levels of windows 11. Just as the preferred embodiment of the horizontal beams 34 on adjacent lower and upper vertical levels being oriented 180° with respect to each other, such that the first end 48 of one horizontal beam is located under the second end 50 of a vertically adjacent horizontal beam, the splash bars 34 on adjacent lower and upper vertical levels are oriented 180° with respect to each other, such that the first end 80 of one splash bar 34 is located under the second end 81 of a vertically adjacent splash bar 34. Using the preferred horizontal beams 15 of the present invention and the preferred splash bars 34 of the present invention allows the splash bars 34 to be staggered vertically and horizontally on adjacent vertical levels to provide the greatest surface area for impingement of the water to enhance evaporative cooling.

Instead of the first locking structure in the form of hole 86 and second locking structure in the form of hole 88, the locking structures on the splash bar 34 could be in the form of depressions in the top of the splash bar 34, raised portions, such as bars preferably having at least one smooth bearing surface, or any other structure that is capable of selectively interlocking with the projections 76 on the extensions 74 of the locking portions 72 of the horizontal beams 15 as described above, such that the splash bar 34 is capable of being retained against longitudinal dislodgement in the windows 11 and the second side edge is capable of being retained on the horizontal beams 15 against vertical dislodgement in the windows 11.

Preferably, the first and second locking structures on the splash bar 34 are holes 86 and 88 extending from the top to the bottom of the splash bar. It is more preferred that the holes 86 and 88 forming the locking structures have a "D" shape in a top plan view with a straight edge and a rounded edge forming the "D" shape, where the straight edge of the "D" shape of each hole forming the locking structures faces the elongated slots 84. With holes 86 and 88 of this shape, the flat surfaces of the projections 76 that are parallel to and face either the front 52 or the back 54 of the horizontal beam 15 can more positively interlock with the respective "D" shape hole 86 and 88.

Preferably, the splash bar 34 is perforated from top to bottom with a plurality of holes 90 to further divide and circulate water being sprayed on or otherwise falling on the splash bars, thereby enhancing evaporative cooling. Preferably, areas 92 of the splash bar that may interfere with retention members such as those associated with retention members 66 or projections 76 associated with locking portions 72 are free of perforation holes 90.

Figure 6:
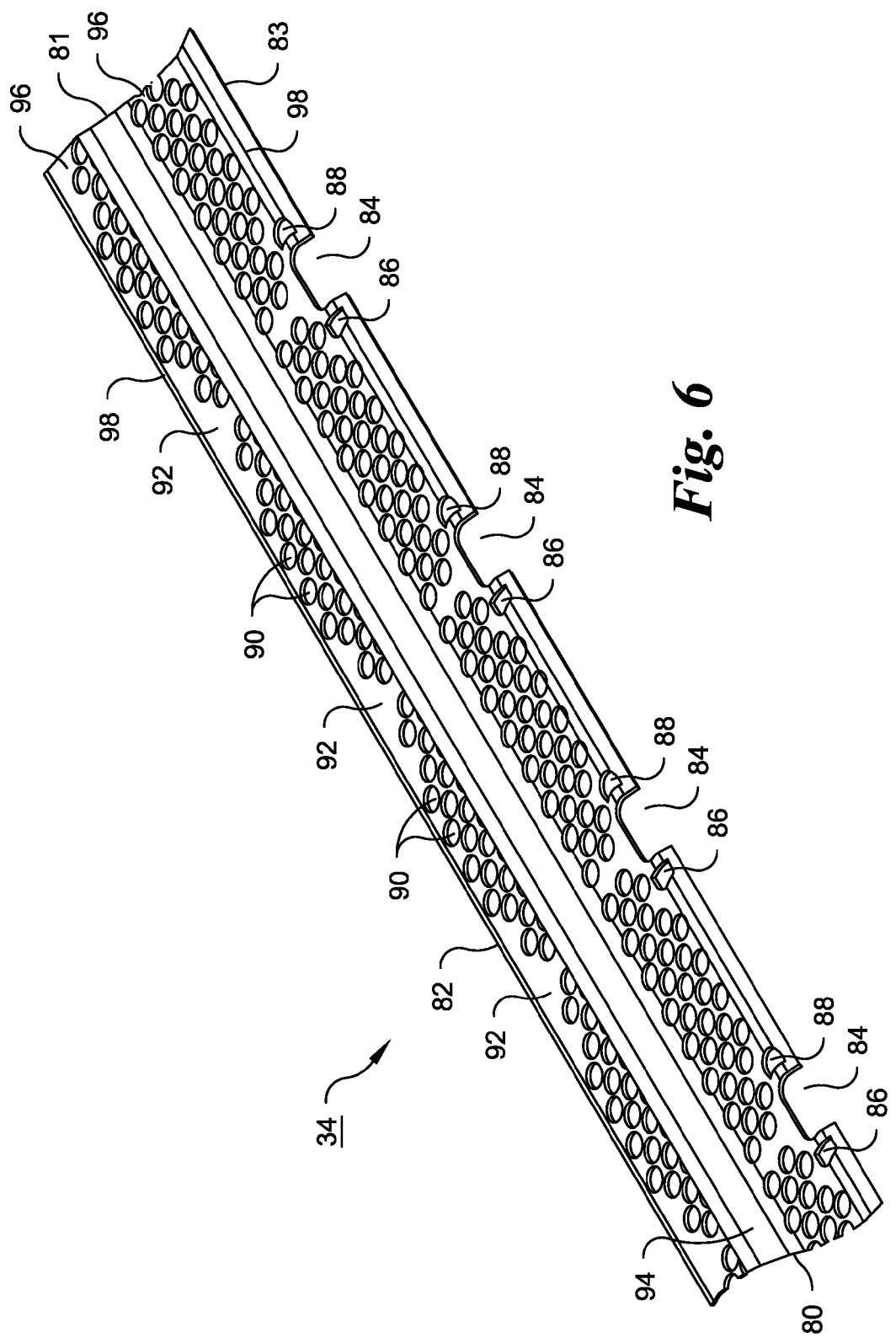
FIG. 6 is an isometric view of a portion of a splash bar according to an embodiment of the present invention.
Figure 7:
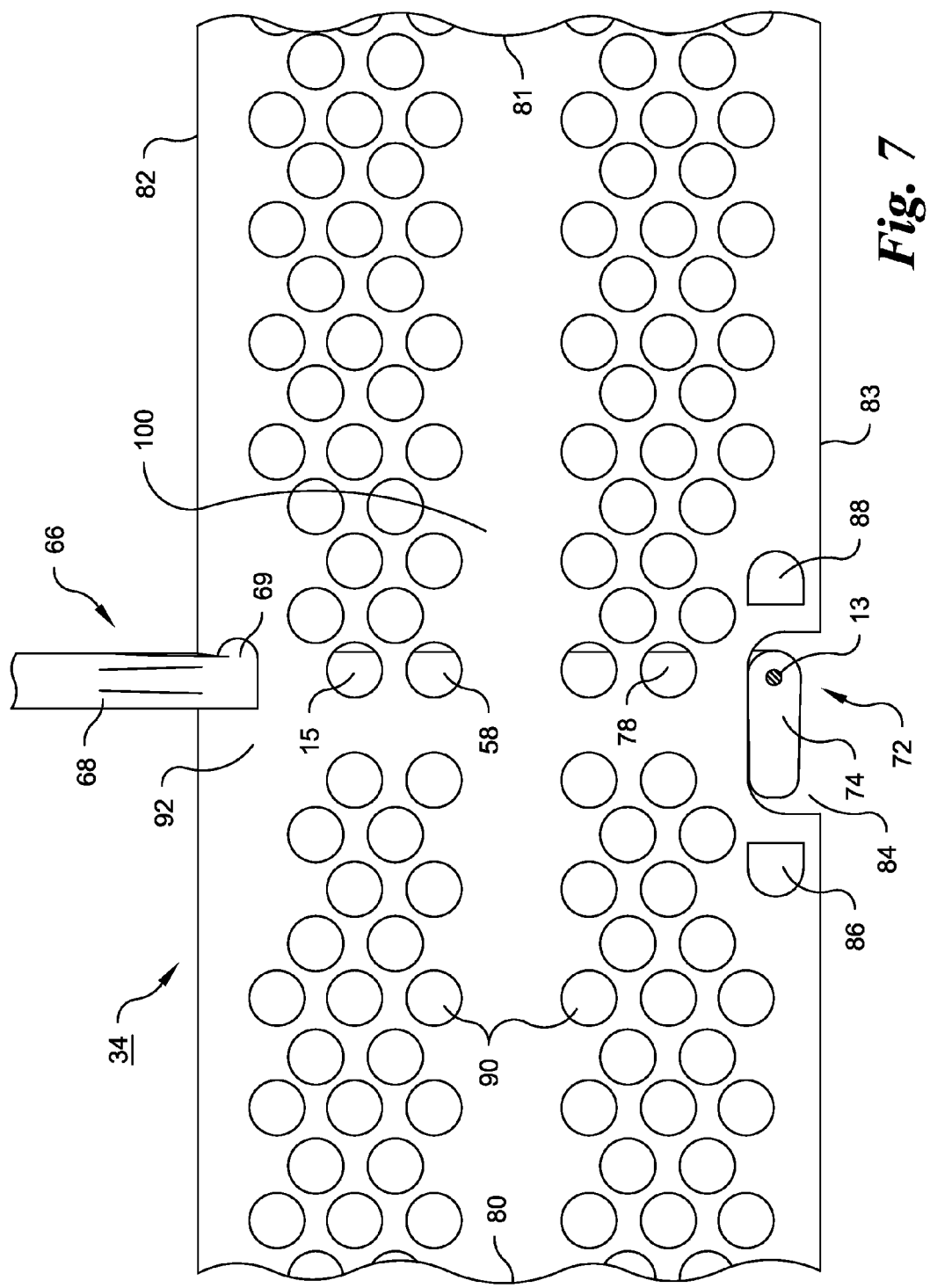
FIG. 7 is a top plan view of a portion of a schematic representation of an embodiment of a splash bar in a ready position about to be secured on a portion of an embodiment of a horizontal beam component within a portion of an embodiment of a hanger grid according to the present invention.
Figure 8:
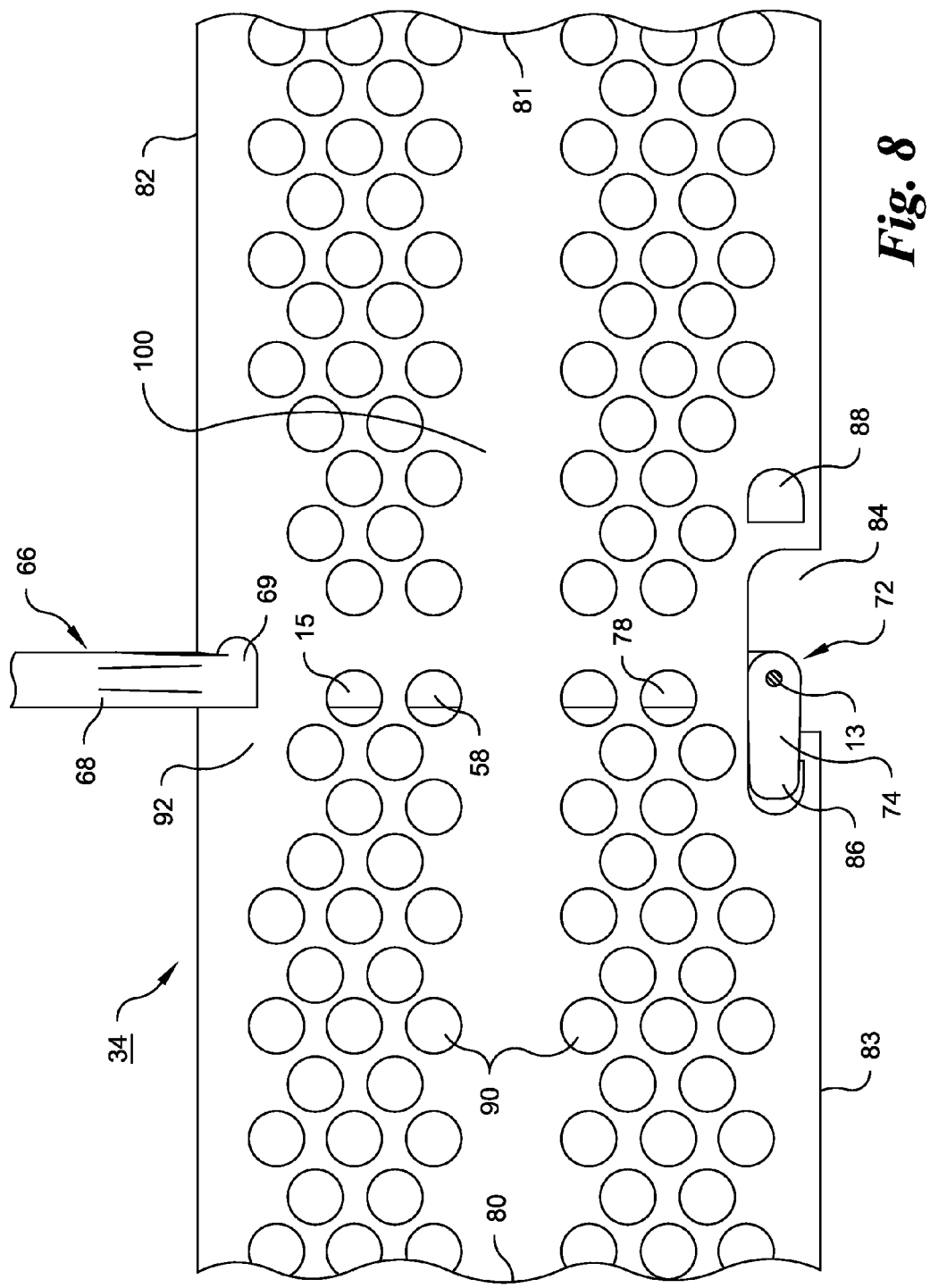
FIG. 8 is a top plan view of a portion of a schematic representation of an embodiment of a splash bar as shown in FIG. 7, but in a secured position on a portion of an embodiment of a horizontal beam component within a portion of an embodiment of a hanger grid according to the present invention.
Figure 9:
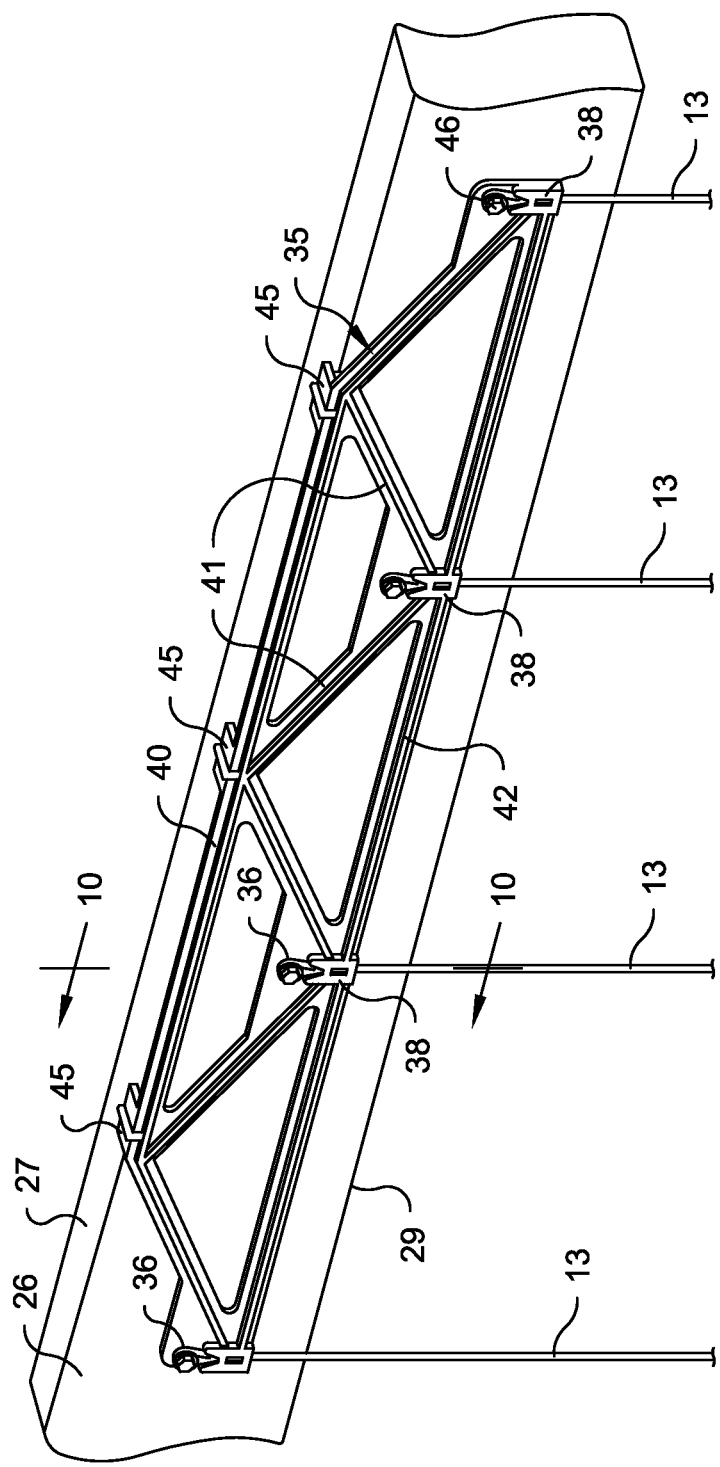
FIG. 9 is an isometric view of a portion of an embodiment of a hanger grid showing an embodiment of a top bracket supported on a structural beam according to the present invention.
Figure 10:
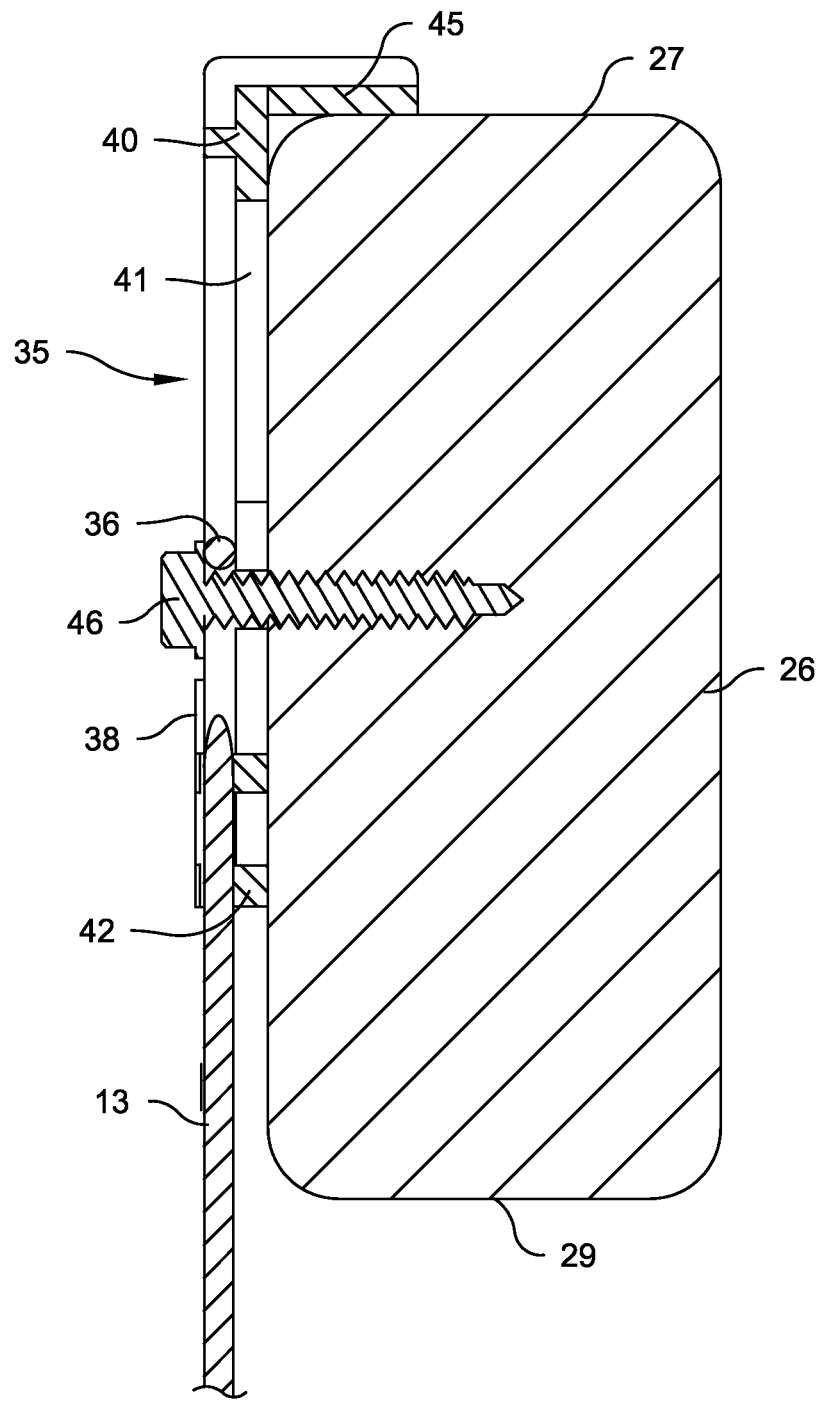
FIG. 10 is a vertical cross-sectional view of a portion of an embodiment of a hanger grid showing the embodiment of a top bracket supported on a structural beam as shown in FIG. 9, according to the present invention.
Figure 11:
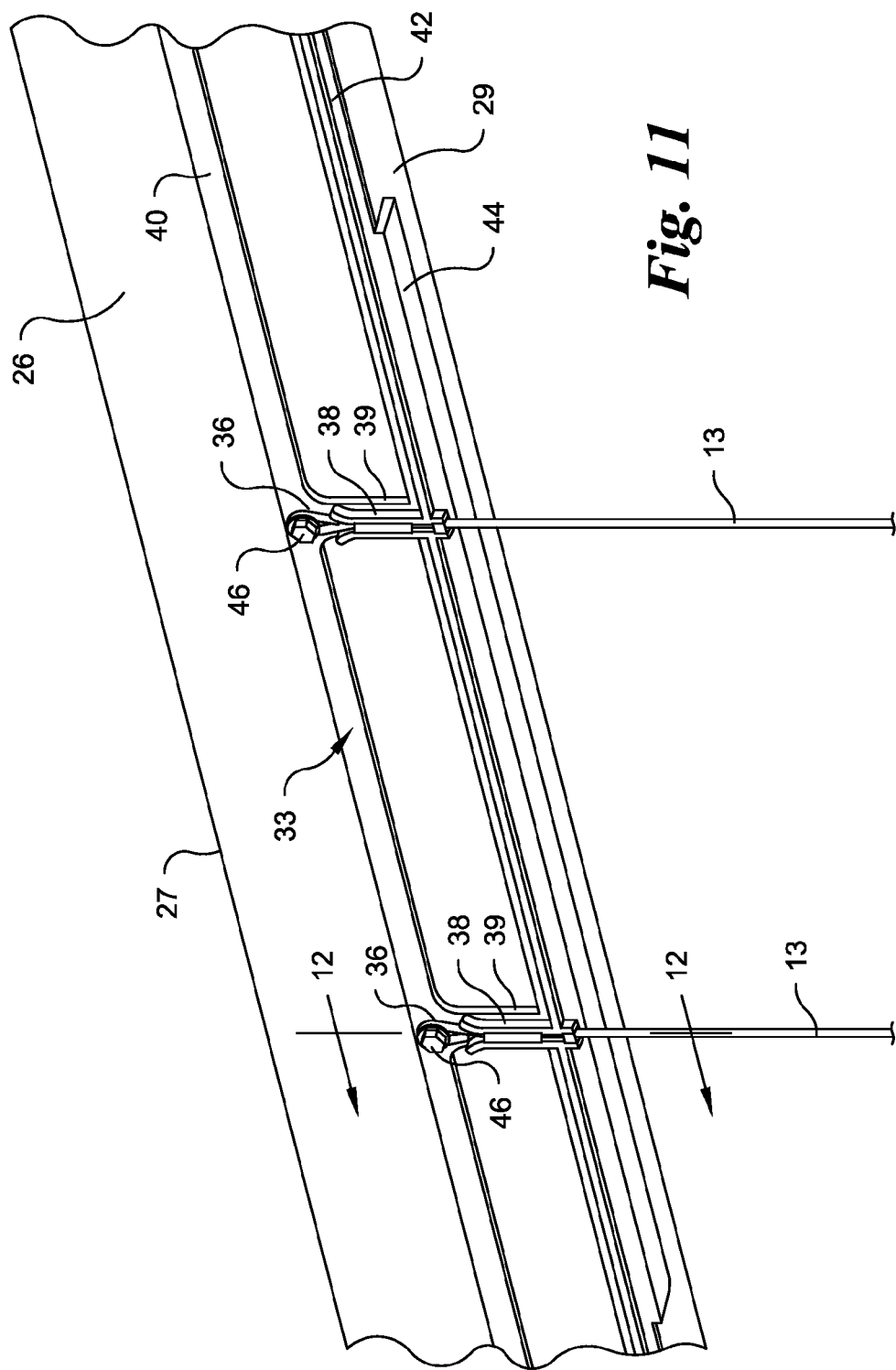
FIG. 11 is an isometric view of a portion of an embodiment of a hanger grid showing another embodiment of a top bracket supported on a structural beam according to the present invention.
Figure 12:
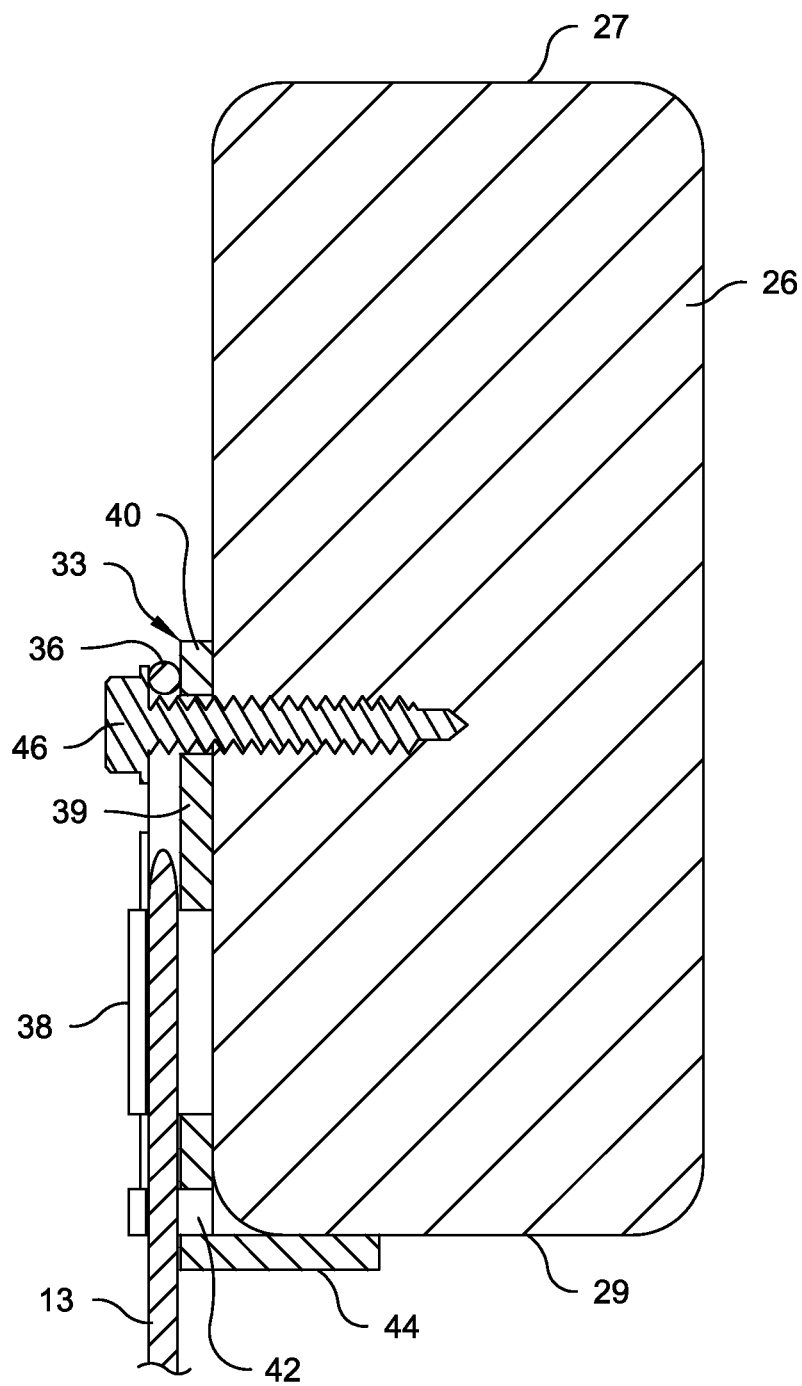
FIG. 12 is a vertical cross-sectional view of a portion of an embodiment of a hanger grid showing the embodiment of a top bracket supported on a structural beam as shown in FIG. 11, according to the present invention.

The splash bars 34 of the present invention as described above can have any desired profile, such as flat with downwardly angled edges, simple or complex curved profile from the first side edge 82 to the second side edge 84, such as a parabolic or other curved shape 100 as schematically shown in the splash bar 34 of FIGS. 7 and 8, or as presently preferred, in the shape of a "Kelly bar" typically in use as shown in the splash bars 34 of FIGS. 2, 3 and 6. A Kelly bar form of splash bar 34 has an inverted "V-shaped" longitudinal ridge 94 unitarily connected on opposite sides to flat or even slightly curved elongated portions 96 that in turn are unitarily connected to downwardly angled elongated portions 98 extending to the respective first side edge 82 and the second edge 83 of the splash bar.

In use, the splash bars 34 of the present invention interlock with the preferred horizontal beams 15 of spaced, parallel vertical hanger grids 10 as shown in FIGS. 7 and 8. FIG. 7 is a top plan view of a portion of a schematic representation of a splash bar 34 in a ready position, having been slid along its first side edge 82 into a position about to be secured on a portion of a horizontal beam 15. The splash bar has been slid under the generally central retention member 66 which restricts the splash bar from moving laterally past the retention member 66. The lower bearing surface 70 bears against or near the top of the splash bar 34 near its first side edge 82, as best shown in FIG. 3 to retain the first side edge 82 against vertical dislodgement from the window 11 and the upper surface 58 of the horizontal beam 15. The second side edge 83 is positioned on the horizontal beam 15 such that the projection 76 (not shown in FIG. 7 from the lower surface 75 (not shown in FIG. 7) of the extension 74 of the locking portion 72 of the horizontal beam 15 is positioned within the elongated slot 84. A part of the raised portion 78 is shown though one of the perforation holes 90 supporting the bottom of the splash bar 34 in the vicinity of the locking portion 72.

FIG. 8 is a top plan view of the portion of the splash bar 34 as shown in FIG. 7, but in a secured position on the horizontal beam 15. Thus, FIG. 8 shows that the splash bar 34 has been pushed in a direction from the first end 80 toward the second end 81 such that the hole 86 of the first lock structure interlocks with the projection 76 (not shown in FIG. 8) from the lower surface 75 (not shown in FIG. 8) of the extension 74 of the locking portion 72 of the horizontal beam 15. FIG. 3 shows this interlocked position with the projection 76 through the hole 86. In its secured position in FIG. 8, the splash bar 34 is retained against longitudinal dislodgement in the windows 11 and the second side edge 83 is retained on the horizontal beams 15 against vertical dislodgement in the windows 11. FIG. 8 also shows a part of the raised portion 78 in a shifted position with respect to the same perforation hole 90 as shown in FIG. 7, with the raised portion 78 still supporting the bottom of the splash bar 34 in the vicinity of the locking portion 72 to help assure a positive-interconnection between the projection 76 and the first or second locking structure (holes 86 and 88) of the splash bar 34.

Another aspect or embodiment of the present invention relates to an evaporative cooler fill assembly within a fill section 14 in a cooling tower 12. The assembly comprises a plurality of horizontally spaced, composite hanger grids 10, each composite hanger grid being supported on one of a plurality of parallel structural support members 26 within the fill section of the cooling tower 12, together with the splash bars, such as splash bars 34, supported generally perpendicularly within the assembly by the horizontal beams 15 of the adjacent hanger grids 10. The hanger grids 10 are those as set forth in the Brief Summary of the Invention section above and as described in detail in the Detailed Description of the Preferred Embodiments of the Invention above. The splash bars of the fill assembly can be any splash bars, but are preferably the splash bars 34 as set forth in the Brief Summary of the Invention section above and as described in detail in the Detailed Description of the Preferred Embodiments of the Invention above. Accordingly, the hanger grids 10 and splash bars 34 will not be described again here.

Other aspects or embodiments of the present invention relate to a method of assembling a composite hanger grid 10 for supporting splash bars in a cooling tower 12, and a method of assembling an evaporative cooler fill assembly supported within a fill section 14 in a cooling tower 12.

The method of assembling a composite hanger grid 10 for supporting splash bars in a cooling tower 12 comprises:

(a) providing a plurality of suspension members to form vertical suspension members 13 of the hanger grid 10 when the hanger grid is hung vertically, each suspension member 13 having a longitudinal axis and a continuous length extending at least to the bottom of the hanger grid when the hanger grid is hung vertically;

(b) providing a plurality of beams to form vertically aligned horizontal beams 15 when the hanger grid is hung vertically, the horizontal beams 15 being separate components from the vertical suspension members 13, each horizontal beam when the hanger grid is hung vertically having a first end 48, a second end 50, a bottom 56, a length, and at least one upper surface portion 58 being capable of supporting a splash bar 34;

(c) threading the suspension members 13 through holes 60 extending substantially perpendicularly through the horizontal beams 15 from the upper surfaces 58 at two or more spaced locations along the length of the horizontal beams;

(d) providing below each horizontal beam 15 a structure associated with and at one of any variable locations along the length of the suspension members 13 by which the horizontal beams 15 are supported in tension by the suspension members 13 when the hanger grid is hung vertically, whereby the vertical suspension members 13 and the horizontal beams 15 form a grid of a plurality of windows 11 defined by the vertical suspension members and the horizontal beams.

Preferably, the method of assembling the hanger grid 10 is performed on a flat surface, such as a bench, table or floor, before the hanger grid is hung vertically. Optionally, but preferably, the flat surface on which the method of assembling the hanger grid 10 is performed either supports a template or itself can be marked with markings showing the location of the suspension members 13, the horizontal beams 15, the beam support structures, such as the deformations 62. Moreover, preferably the suspension members 13 can be placed within a bracket that will become a top bracket, such as the top bracket 33 or the top bracket 35 discussed above. Other details of this method are as described in detail in the Detailed Description of the Preferred Embodiments of the Invention above and as claimed below and will not be repeated here.

The method of assembling an evaporative cooler fill assembly supported within a fill section 14 in a cooling tower 12 comprises:

(a) Providing a plurality of composite hanger grids 10, each composite hanger grid being supported on one of a plurality of parallel horizontal structural support members 26 within the fill section 14 of the cooling tower to hang a plurality of the hanger grids 10 substantially parallel to each other, the composite hanger grids 10 being capable of supporting splash bars 34. Each splash bar 34 has a first side edge 82 and a second side edge 83. The hanger grid comprises a plurality of vertical suspension members 13, each suspension member having a longitudinal axis and a continuous length extending at least to the bottom of the hanger grid 10. The hanger grid 10 further comprises a plurality of vertically aligned horizontal beams 15, preferably, but not necessarily made of a synthetic polymer, as separate components from the vertical suspension members 13. Each horizontal beam 15 has a first end 48, a second end 50, a front 52, a back 54, a bottom 56, a length, and at least one upper surface portion 58, each upper surface portion being capable of supporting a splash bar 34. All of the vertical suspension members 13 extend substantially perpendicularly through the horizontal beams 13 at two or more spaced locations along the length of the horizontal beams. Each horizontal beam is supported by a structure associated with and at one of any variable locations along the length of the suspension members 13 by which the horizontal beams 15 are supported in tension by the suspension members, whereby the suspension members and the horizontal beams form a grid of a plurality of windows 11 having a height and a width defined by the suspension members 13 and the horizontal beams 15. The plurality of windows 11 of one hanger grid 10 are aligned within the fill section 14 of the cooling tower 12 with the plurality of windows 11 of vertically parallel adjacent hanger grids 10 such that the splash bars 34 can be supported generally perpendicularly within the assembly by the horizontal beams 15 of the adjacent hanger grids. The horizontal beams 15 have generally central unitary retention members 66 approximately midway between the vertical suspension members 13 defining sides of the windows and extending above the upper surface portion 58, the generally central unitary retention member 66 being capable of retaining a splash bar 34 against lateral movement within the window 34 and the generally central unitary retention members 66 have a lower bearing surface 70 capable of retaining the first side edge 82 of a splash bar 34 seated on the upper surface portion 58 of the horizontal beam 15 against being vertically dislodged within the window 11. The horizontal beams 15 have unitary locking portions 72 extending above the upper surface portions 58 at the second end and at other, intermediate locations along the length of the horizontal beam through which the vertical suspension members 13 extend, each of the locking portions 72 having a unitary extension 74 perpendicular to the front 52 and back 54 of the horizontal beam 15, where adjacent unitary extensions 74 perpendicular to the front and back of the horizontal beam face in opposite directions with respect to the front and back of the horizontal beam, each of the unitary extensions 74 having a projection 76 extending from a lower surface of the extensions.

The method of assembling an evaporative cooler fill assembly supported within a fill section 14 in a cooling tower 12 further comprises:

(b) Providing the splash bars 34 to be inserted into the plurality of hanger grids, the splash bars further having an elongated shape with a longitudinal axis, a top, a bottom, a first end 80, a second end 81, a length and a width, the first side edge 82 being free of openings extending to the first side edge such that the splash bar is capable of freely sliding on the horizontal beams 15 generally perpendicular through aligned windows 11 of the plurality of parallel hanger grids 10, the second side edge 83 having a plurality of elongated slots 84 spaced parallel to and longitudinally along the second side edge adjacent to locations where vertical suspension members 13 of the windows 11 of adjacent, parallel hanger grids 10 are located, the elongated slots 84 extending to the second side edge 83, the splash bar 34 further comprising locking structures equally spaced from, on opposite front and back sides of and longitudinally aligned with the elongated slots 84.

The method of assembling an evaporative cooler fill assembly supported within a fill section 14 in a cooling tower 12 further comprises:

(c) sliding a first splash bar 34 along its first side edge 82 onto an upper surface portion 58 of the horizontal beams 15 on one side of and adjacent the lower bearing surface 70 of the generally central retainer members 66 into aligned windows 11 of the plurality of hanger grids 10 until the elongated slots 84 on the second side edge of the first splash bar 34 aligns with vertical suspension members 13 of the parallel hanger grids 10.

The method of assembling an evaporative cooler fill assembly supported within a fill section 14 in a cooling tower 12 further comprises:

(d) Laying the first splash bar 34 flat on the horizontal beams 15 with the elongated slots 84 along the second side edge 83 aligned with the vertical suspension members 13 and with the first side edge 82 adjacent to the generally central retention member 66 to retain the first splash bar 34 against lateral movement within the windows 11, the first side edge of the first splash bar being underneath the lower bearing surface 70 of the generally central retainer member 66 to retain the first side edge 82 of the first splash bar 34 seated on one of the upper surface portions 58 of the horizontal beams 15 against being vertically dislodged within the windows 11.

The method of assembling an evaporative cooler fill assembly supported within a fill section 14 in a cooling tower 12 further comprises:

(e)(1) Pushing or pulling the first splash bar 34 as appropriate along the longitudinal axis of the first splash bar to align and interlock a plurality of the locking structures on one side of the elongated slot 84 along the second edge 83 of the of the first splash bar with a plurality of aligned projections 76 extending from the lower surface 75 of the unitary extensions 74 perpendicular to the front 52 or back 54 of the horizontal beam of the locking portions 72 of the horizontal beams 15 through which the aligned vertical suspension member 13 extends, such that the projections 76 interlock with the locking structures on the first splash bar 34 to retain the first splash bar against longitudinal dislodgement in the windows 11 and to retain the second side edge 83 of the first splash bar seated on the upper surface portion of the horizontal beams against vertical dislodgement within the windows 11.

The preferred splash bars 34 as described above may be inserted sequentially into the series of vertically parallel hanger grids 10 within the fill section 14 of the cooling tower 12 to assemble an evaporative cooler fill assembly. The splash bars 34 may be inserted into the series of parallel hanger grids 10 starting at one side of the bottom row of windows 11 and moving to the other side of the bottom row of windows and repeating this for successive higher rows of windows 11. Alternatively, the splash bars 34 may be inserted into the series of parallel hanger grids 10 starting at one side of the top row of windows 11 and moving to the other side of the top row of windows and repeating this for successive lower rows of windows 11. Conceivably, the splash bars 34 may be inserted into the series of parallel hanger grids 10 in the order of vertical columns from top to bottom or bottom to top and then moving from one side to the other, but this is not practical for tall hanger grids, as it would entail excessive ladder climbing.

However the splash bars are installed, typically there is no access at the deep or back end of the fill section 14, and as the assembly is filled, there is less room to work at least at one side. These considerations highlight the benefit of using the preferred splash bars 34 with the elongated slots 84 and the associated locking structures, such as holes 86 and 88, together with the preferred horizontal beams 15 with the retention members 66 and locking portions 72, and preferably with the unitary tubular portions 64. By standing facing the windows 11 of the series of parallel hanger grids 10, the splash bars 34 may be inserted through the windows very efficiently and locked in place vertically, longitudinally and laterally along both side edges 82 and 83 along their entire length, which may be any desired length, such as often up to 12 feet long (about 3.7 meters). This is accomplished readily with minimal labor just by slightly tilting the splash bars on the first side edge 82, sliding them longitudinally into the hanger grids 10, sliding the first side edges 82 slightly laterally and under the generally central retention members 66, laying them flat with the elongated slots 84 aligned with the vertical wires 13, and slightly pulling or pushing them until the projections 76 on the locking portions 72 of the horizontal beams 15 interlock with one of the locking structures, such as holes 86 or 88 of the splash bar 34.

To avoid applying excessive torque or stress on the series of hanger grids 10, and still being able to apply appropriate force to lock the slash bars in place within the hanger grids, the final pushing or pulling of the splash bars 34 to create the interlock may be deferred until there are two or more splash bars side by side on the same vertical level or on adjacent vertical levels. Because of the structures of the opposite facing perpendicular extensions 74 on the locking portions 72 of the horizontal members, splash bars 34 being inserted on the same level will have their first side edges 82 facing the same side (either right or left), and splash bars on adjacent vertical levels will have their first side edges 82 facing in the opposite direction as those on the adjacent vertical level (that is, either left or right). Horizontally adjacent splash bars on the same level (and horizontally adjacent, staggered splash bars on different vertical levels) can be finally locked in position by substantially simultaneously pushing one splash bar and by pulling a horizontally adjacent splash bar on the same or adjacent vertical level. This may make the installation easier and more efficient.

In view of these features, it is preferred that the width of each window 11 corresponds to a width of two splash bars, and that the horizontal beams 15 at each adjacent vertical level within the hanger grid 10 are oriented 180° with respect to each other, such that the first end 48 of one horizontal beam 15 is located under the second end 50 of a vertically adjacent horizontal beam 15. With these preferential aspects, the method of assembling an evaporative cooler fill assembly supported within a fill section 14 in a cooling tower 12 as set forth above in paragraphs [00118] to [00127] may further or alternatively comprise after (d) in paragraph[0125] above:

(d1) Sliding a second splash bar 34 along its first side edge 82 onto a horizontally adjacent upper surface portion 58 of the horizontal beams 15 on the same vertical level or on an adjacent vertical level on one side of and adjacent the lower bearing surface 70 of the generally central retainer members 66 into aligned windows 11 of the plurality of hanger grids 10 until the elongated slots 84 on the second side edge 84 of the second splash bar aligns with vertical suspension members 13 of the parallel hanger grids;

(d2) Laying the second splash bar 38 flat on the horizontal beams 15 of the same or adjacent vertical level with the elongated slots 84 along the second side edge aligned with the vertical suspension members 13 and with the first side edge 82 underneath the lower bearing surface 70 of the generally central retainer members 66 of the respective same or adjacent vertical level, where the second splash bar in an adjacent vertical level is in a location staggered horizontally and vertically from the first laid splash bar 34 to retain the first side edge 82 of the second splash bar 34 seated on one of the upper surface portions 58 of the horizontal beams 15 from being laterally and vertically dislodged within the window 11; and in lieu of (e)(1), (e)(2) Pushing or pulling the first splash bar 34 as appropriate and substantially simultaneously pulling or pushing the second splash bar 34 as appropriate in the opposite direction from the first splash bar and along the longitudinal axis of the respective first and second splash bars to align and interlock their respective locking structures (such as holes 86 or 88) with a plurality of aligned projections 76 extending from the lower surface 75 of the unitary extensions 74 in opposite directions perpendicular to the front 52 or back 54 of the horizontal beam 15 to retain the first and second splash bars against longitudinal dislodgement in the windows and to retain the second side edges of the first and second splash bars seated on the upper surface portion of the horizontal beams against vertical dislodgement within the windows.

Other details of this method of assembling an evaporative cooler fill assembly supported within a fill section 14 in a cooling tower 12 are as described in detail in the Detailed Description of the Preferred Embodiments of the Invention above and as claimed below and will not be repeated here.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A composite hanger grid having a top and a bottom and a width, the hanger grid being capable of supporting splash bars generally perpendicular to the hanger grid, wherein each splash bar has a first side edge and a second side edge, the hanger grid comprising:
   a plurality of vertical suspension members, each suspension member having a longitudinal axis and a continuous length extending at least to the bottom of the hanger grid;
   at least two vertically aligned horizontal beams as separate components from the vertical suspension members, each horizontal beam having a first end, a second end, a bottom, a length, and at least one upper surface portion being capable of supporting a splash bar, all of the suspension members extending substantially perpendicularly through the horizontal beams at two or more spaced locations along the length of the horizontal beams;
   each horizontal beam being supported by a structure associated with and at one of any variable locations along the length of the suspension members by which the horizontal beams are supported in tension by the suspension members, whereby the suspension members and the horizontal beams form a grid of a plurality of windows defined by the suspension members and the horizontal beams.

2. The composite hanger grid of claim 1, wherein the length of the horizontal beam defines the width of the hanger grid and wherein the vertical suspension members are substantially equally spaced along the length of the horizontal beam.

3. The composite hanger grid of claim 1, wherein the vertical suspension members are metal wires.

4. The composite hanger grid of claim 3, wherein each wire supports the beams by a deformation in each wire respectively below each horizontal beam.

5. The composite hanger grid of claim 4, wherein each deformation is a strain-hardened deformation.

6. The composite hanger grid of claim 5, wherein the deformation is a cold-formed deformation selected from the group consisting of a crimp having an arc shape adjacent the bottom of the horizontal beam sufficient to support the horizontal beam, a crimp having an angle of about 45° with respect to the longitudinal axis of the wire and adjacent the bottom of the horizontal beam, and a crimp having an angle of about 90° with respect to the longitudinal axis of the wire and adjacent the bottom of the horizontal beam.

7. The composite hanger grid of claim 1, wherein each suspension member terminates in an eyelet at an upper end of the suspension member.

8. The composite hanger grid of claim 7, wherein the eyelets are positioned in a top bracket having a length at spaced locations along the length of the top bracket corresponding to the spaced locations of the suspension members through and along the length of the horizontal beams, the eyelets being capable of receiving fasteners and of supporting the hanger grid.

9. The composite hanger grid of claim 8, wherein the top bracket has a bottom horizontal flange capable of aligning the top bracket with a bottom edge of a support member within a cooling tower to support the hanger grid within the cooling tower.

10. The composite hanger grid of claim 1, wherein the windows have a width and a height such that the width of each window corresponds to a width of two splash bars.

11. The composite hanger grid of claim 10, wherein the height of each of the windows within the hanger grid is substantially the same.

12. The composite hanger grid of claim 10, wherein the height of the windows within the hanger grid is variable.

13. The composite hanger grid of claim 12, wherein the height of the windows within the hanger grid is such that windows near the top of the hanger grid have a height less than the height of the windows near the bottom of the hanger grid, wherein the height of the windows increases incrementally from the top to the bottom of the hanger grid.

14. The composite hanger grid of claim 1, wherein the horizontal beams are synthetic polymeric beams and have a unitary tubular portion extending above the upper surface portion at the first end of the horizontal beam through which a suspension member extends.

15. The composite hanger grid of claim 1, wherein the horizontal beams have a generally central unitary retention member approximately midway between the suspension members defining sides of a window, the unitary retention member being capable of retaining the first side edge of a splash bar seated on the upper surface portion of the horizontal beam against being dislodged within the window.

16. The composite hanger grid of claim 15, wherein the generally central unitary retention member extends above the upper surface portion and is capable of retaining a splash bar against lateral movement within the window and wherein the generally central unitary retention member has a lower bearing surface capable of retaining the first side edge of a splash bar seated on the upper surface portion of the horizontal beam against being vertically dislodged within the window.

17. The composite hanger grid of claim 1, wherein the horizontal beams have a front and a back and unitary locking portions extending above the upper surface portions at least at one or more of the second end and at other, intermediate locations along the length of the horizontal beam through which the suspension members extend, each of the locking portions having a unitary extension perpendicular to the front and back of the horizontal beam, and when there are two or more unitary locking portions on a horizontal beam, adjacent unitary extensions perpendicular to the front and back of the horizontal beam face in opposite directions with respect to the front and back of the horizontal beam, each of the unitary extensions having a projection extending from a lower surface of the extension capable of interlocking with a mating locking structure of a splash bar to retain a splash bar against longitudinal dislodgement in the window and to retain the second side edge of a splash bar seated on the upper surface portion of the horizontal beam against being vertically dislodged within the window.

18. The hanger grid of claim 1, wherein the length of the horizontal beam defines the width of the hanger grid, wherein the horizontal beams are synthetic polymeric beams with a front and a back and have a unitary tubular portion extending above the upper surface portions at the first end of the horizontal beam through which a suspension member extends, the unitary tubular portion being capable of retaining a splash bar against lateral movement within the window; a generally central unitary retention member approximately midway between the suspension members defining sides of the windows and extending from the upper surface portions, the generally central retention member being capable of retaining a splash bar against lateral movement within the window, the generally central unitary retention member having a lower bearing surface capable of retaining the first side edge of splash bars seated on the upper surface portions of the beam against being vertically dislodged within the windows; and unitary locking portions extending above the upper surface portions at the second end and at other, intermediate locations along the length of the horizontal beam through which the suspension members extend, each of the locking portions having a unitary extension perpendicular to the front and back of the horizontal beam, where adjacent unitary extensions perpendicular to the front and back of the horizontal beam face in opposite directions with respect to the front and back of the horizontal beam, each of the unitary extensions having a projection extending from a lower surface capable of interlocking with a mating locking structure of a splash bar to retain the splash bar against longitudinal dislodgement in the windows and retain the second side edge of a splash bar seated on the upper surface portion of the horizontal beam against being vertically dislodged within the windows.

19. The hanger grid of claim 18, wherein the horizontal beams at each successively lower vertical level within the hanger grid are oriented 180° with respect to each other, such that the first end of one horizontal beam is located under the second end of a vertically adjacent horizontal beam.

20. An evaporative cooler fill assembly capable of being supported within a fill section in a cooling tower, the cooling tower having a top, a bottom, a front, a back, a first side and a second side, the assembly comprising:
a plurality of horizontally spaced, composite hanger grids, each composite hanger grid being supported on one of a plurality of parallel structural support members within the fill section of the cooling tower, the composite hanger grid being capable of supporting splash bars generally perpendicular to the hanger grid, wherein each splash bar has a first side edge and a second side edge, the hanger grid comprising:
a plurality of vertical suspension members, each suspension member having a longitudinal axis and a continuous length extending at least to the bottom of the hanger grid;
at least two vertically aligned horizontal beams as separate components from the vertical suspension members, each horizontal beam having a first end, a second end, a bottom, a length, and at least one upper surface portion being capable of supporting a splash bar, all of the suspension members extending substantially perpendicularly through the horizontal beams at two or more spaced locations along the length of the horizontal beams;
each horizontal beam being supported by a structure associated with and at one of any variable locations along the length of the suspension members by which the horizontal beams are supported in tension by the suspension members, whereby the suspension members and the horizontal beams form a grid of a plurality of windows defined by the vertical suspension members and the horizontal beams; and
splash bars supported generally perpendicularly within the assembly by the horizontal beams of the adjacent hanger grids.

21. The evaporative cooler fill assembly of claim 20, wherein the length of the horizontal beams defines the width of the hanger grid and wherein the vertical suspension members are substantially equally spaced along the length of the horizontal beams within the fill section of the cooling tower.

22. The evaporative cooler fill assembly of claim 20, wherein the vertical suspension members are metal wires.

23. The evaporative cooler fill assembly of claim 22, wherein each wire supports the beams by a deformation in each wire respectively below each horizontal beam.

24. The evaporative cooler fill assembly of claim 23, wherein each deformation is a strain-hardened deformation.

25. The evaporative cooler fill assembly of claim 24, wherein the deformation is a cold-formed deformation selected from the group consisting of a crimp having an arc shape adjacent the bottom of the horizontal beam sufficient to support the horizontal beam, a crimp having an angle of about 45° with respect to the longitudinal axis of the wire and adjacent the bottom of the horizontal beam, and a crimp having an angle of about 90° with respect to the longitudinal axis of the wire and adjacent the bottom of the horizontal beam.

26. The evaporative cooler fill assembly of claim 20, wherein each suspension member terminates in an eyelet at an upper end of the suspension member.

27. The evaporative cooler fill assembly of claim 26, wherein the eyelets are positioned in a top bracket having a length at spaced locations along the length of the top bracket corresponding to the spaced locations of the suspension members through and along the length of the horizontal beams, the eyelets being capable of receiving fasteners and of supporting the hanger grid.

28. The evaporative cooler fill assembly of claim 27, wherein the top bracket has a bottom horizontal flange aligned with a bottom edge of the support member within the cooling tower.

29. The evaporative cooler fill assembly of claim 20, wherein the windows have a width and a height such that the width of each window corresponds to a width of two splash bars.

30. The evaporative cooler fill assembly of claim 29, wherein the height of each of the windows within the hanger grid is substantially the same.

31. The evaporative cooler fill assembly of claim 29, wherein the height of the windows within the hanger grid is variable.

32. The evaporative cooler fill assembly of claim 31, wherein the height of the windows within the hanger grid is such that windows near the top of the hanger grid have a height less than the height of the windows near the bottom of the hanger grid, wherein the height of the windows increases incrementally from the top to the bottom of the hanger grid.

33. The evaporative cooler fill assembly of claim 20, wherein the horizontal beams are synthetic polymeric beams and have a unitary tubular portion extending above the upper surface portion at the first end of the horizontal beam through which a suspension member extends.

34. The evaporative cooler fill assembly of claim 20, wherein the horizontal beams are synthetic polymeric beams and have a generally central unitary retention member approximately midway between the suspension members defining sides of a window, the unitary retention member retaining the first side edge of a splash bar seated on the upper surface portion of the horizontal beam against being dislodged within the window.

35. The evaporative cooler fill assembly of claim 34, wherein the generally central unitary retention member extends above the upper surface portion and retains a splash bar against lateral movement within the window and wherein the generally central unitary retention member has a lower bearing surface that retains the first side edge of a splash bar seated on the upper surface portion of the horizontal beam against being vertically dislodged within the window.

36. The evaporative cooler fill assembly of claim 20, wherein the horizontal beams have a front and a back and unitary locking portions extending above the upper surface portions at least at one or more of the second end and at other, intermediate locations along the length of the horizontal beam through which the suspension members extend, each of the locking portions having a unitary extension perpendicular to the front and back of the horizontal beam, and when there are two or more unitary locking portions on a horizontal beam, adjacent unitary extensions perpendicular to the front and back of the horizontal beam face in opposite directions with respect to the front and back of the horizontal beam, each of the unitary extension having a projection extending from a lower surface of the extension interlocking with a mating locking structure of a splash bar to retain a splash bar against longitudinal dislodgement in the window and to retain the second side edge of a splash bar seated on the upper surface portion of the horizontal beam against being vertically dislodged within the window.

37. The evaporative cooler fill assembly of claim 20, wherein the length of the horizontal beam defines the width of the hanger grid, and wherein the horizontal beams are synthetic polymeric beams with a front and a back and have a unitary tubular portion extending above the upper surface portions at the first end of the horizontal beam through which a suspension member extends, the unitary tubular portion retaining a splash bar against lateral movement within the window; a generally central unitary retention member approximately midway between the suspension members defining sides of the windows and extending from the upper surface portions, the generally central retention member retaining a splash bar against lateral movement within the window, the generally central unitary retention member having a lower bearing surface retaining the first side edge of splash bars seated on the upper surface portions of the beam against being vertically dislodged within the windows; and unitary locking portions extending above the upper surface portions at the second end and at other, intermediate locations along the length of the horizontal beam through which the suspension members extend, each of the locking portions having a unitary extension perpendicular to the front and back of the horizontal beam, where adjacent unitary extensions perpendicular to the front and back of the horizontal beam face in opposite directions with respect to the front and back of the horizontal beam, each of the unitary extensions having a projection extending from a lower surface interlocking with a mating locking structure of a splash bar to retain the splash bar against longitudinal dislodgement in the windows and retain the second side edge of a splash bar seated on the upper surface portion of the horizontal beam against being vertically dislodged within the windows.

38. The evaporative cooler fill assembly of claim 37, wherein the horizontal beams at each successively lower vertical level within the hanger grid are oriented 180° with respect to each other, such that the first end of one horizontal beam is located under the second end of a vertically adjacent horizontal beam and such that splash bars are retained on opposite sides of the generally central retention members on adjacent vertical levels to be offset vertically and horizontally from the splash bars on the vertically adjacent horizontal beams.

39. The evaporative cooler fill assembly of claim 38, the splash bar having an elongated shape with a longitudinal axis, a top, a bottom, a front end, a back end, a length and a width, a first side edge and a second side edge, the first side edge being free of openings extending to the first side edge such that the splash bar is capable of freely sliding on horizontal beams generally perpendicular through aligned windows of a plurality of parallel hanger grids, the second side edge having a plurality of elongated slots spaced parallel to and longitudinally along the second side edge adjacent to locations where vertical members of the windows of adjacent, parallel hanger grids are located, the elongated slots extending to the second side edge, the splash bar further comprising locking structures equally spaced from, on opposite front and back sides of and longitudinally aligned with the elongated slots, whereby extensions on locking portions associated with the hanger grid having projections on lower surfaces of the extensions have bearing surfaces that are capable of interlocking with the locking structures such that the splash bars are capable of being retained against longitudinal dislodgement in the windows and the second side edges are capable of being retained on the horizontal beams against vertical dislodgement in the windows.

40. The evaporative cooler fill assembly of claim 39, wherein the splash bars are perforated from top to bottom with a plurality of holes.

41. The evaporative cooler fill assembly of claim 39, wherein the locking structures are holes extending from the top to the bottom of the splash bars.

42. The evaporative cooler fill assembly of claim 41, wherein the holes forming the locking structures have a "D" shape in a top plan view with a straight edge and a rounded edge forming the "D" shape, where the straight edge of the "D" shape of each hole forming the locking structures faces the elongated slots.

43. The evaporative cooler fill assembly of claim 39, wherein the splash bars are in the form of Kelly bars having an inverted "V-shaped" longitudinal ridge unitarily connected on opposite sides to flat elongated portions that in turn are unitarily connected to downwardly angled elongated portions extending to the respective first and second edges of the splash bars.

44. The evaporative cooler fill assembly of claim 43, wherein the splash bars are perforated from top to bottom with a plurality of holes.

45. The evaporative cooler fill assembly of claim 44, wherein the locking structures are holes extending from the top to the bottom of the splash bars.

46. The evaporative cooler fill assembly of claim 45, wherein the holes forming the locking structures have a "D" shape in a top plan view with a straight edge and a rounded edge forming the "D" shape, where the straight edge of the "D" shape of each hole forming the locking structures faces the elongated slots.

47. A method of assembling a composite hanger grid for supporting splash bars in a cooling tower, the method comprising:
(a) providing a plurality of suspension members to foiin vertical suspension members of the hanger grid when the hanger grid is hung vertically, each suspension member having a longitudinal axis and a continuous length extending at least to the bottom of the hanger grid when the hanger grid is hung vertically;
(b) providing a plurality of beams to form vertically aligned horizontal beams when the hanger grid is hung vertically, the horizontal beams being separate components from the vertical suspension members, each horizontal beam when the hanger grid is hung vertically having a first end, a second end, a bottom, a length, and at least one upper surface portion being capable of supporting a splash bar,
(c) threading the suspension members through holes extending substantially perpendicularly through the horizontal beams from the upper surfaces at two or more spaced locations along the length of the horizontal beams;
(d) providing below each horizontal beam a structure associated with and at one of any variable locations along the length of the suspension members by which the horizontal beams are supported in tension by the suspension members when the hanger grid is hung vertically, whereby the vertical suspension members and the horizontal beams form a grid of a plurality of windows defined by the vertical suspension members and the horizontal beams.

48. A method of assembling an evaporative cooler fill assembly capable of being supported within a fill section in a cooling tower, the method comprising:
(a) providing a plurality of composite hanger grids, each composite hanger grid being supported on one of a plurality of parallel horizontal structural support members within the fill section of the cooling tower to hang a plurality of the hanger grids substantially parallel to each other, the composite hanger grids being capable of supporting splash bars, wherein each splash bar has a first side edge and a second side edge, the hanger grid comprising:
a plurality of vertical suspension members, each suspension member having a longitudinal axis and a continuous length extending at least to the bottom of the hanger grid;
a plurality of vertically aligned horizontal beams as separate components from the vertical suspension members, each horizontal beam having a first end, a second end, a front, a back, a bottom, a length, and at least one upper surface portion, each upper surface portion being capable of supporting a splash bar, all of the vertical suspension members extending substantially perpendicularly through the horizontal beams at two or more spaced locations along the length of the horizontal beams;
each horizontal beam being supported by a structure associated with and at one of any variable locations along the length of the suspension members by which the horizontal beams are supported in tension by the suspension members, whereby the suspension members and the horizontal beams form a grid of a plurality of windows having a height and width defined by the vertical suspension members and the horizontal beams, the plurality of windows of one hanger grid being aligned within the cooling tower with the plurality of windows of vertically parallel adjacent hanger grids such that the splash bars can be supported generally perpendicularly within the assembly by the horizontal beams of the adjacent hanger grids;
wherein the horizontal beams have generally central unitary retention members approximately midway between the vertical suspension members defining sides of the windows and extending above the upper surface portion, the generally central unitary retention being capable of retaining a splash bar against lateral movement within the window and wherein the generally central unitary retention members have a lower bearing surface capable of retaining the first side edge of a splash bar seated on the upper surface portion of the horizontal beam against being vertically dislodged within the window;
the horizontal beams having unitary locking portions extending above the upper surface portions at the second end and at other, intermediate locations along the length of the horizontal beam through which the vertical suspension members extend, each of the locking portions having a unitary extension perpendicular to the front and back of the horizontal beam, where adjacent unitary extensions perpendicular to the front and back of the horizontal beam face in opposite directions with respect to the front and back of the horizontal beam, each of the unitary extensions having a projection extending from a lower surface of the extensions;

(b) providing the splash bars to be inserted into the plurality of hanger grids, the splash bars further having an elongated shape with a longitudinal axis, a top, a bottom, a front end, a back end, a length and a width, the first side edge being free of openings extending to the first side edge such that the splash bar is capable of freely sliding on the horizontal beams generally perpendicular through aligned windows of the plurality of parallel hanger grids, the second side edge having a plurality of elongated slots spaced parallel to and longitudinally along the second side edge adjacent to locations where vertical suspension members of the windows of adjacent, parallel hanger grids are located, the elongated slots extending to the second side edge, the splash bar further comprising locking structures equally spaced from, on opposite front and back sides of and longitudinally aligned with the elongated slots;

(c) sliding a first splash bar along its first edge onto an upper surface portion of the horizontal beams on one side of and adjacent the lower bearing surface of the generally central retainer members into aligned windows of the plurality of hanger grids until the elongated slots on the second side edge of the first splash bar aligns with vertical suspension members of the parallel hanger grids;

(d) laying the first splash bar flat on the horizontal beams with the elongated slots along the second side edge aligned with the vertical suspension members and with the first side edge adjacent to the generally central retention member to retain the first splash bar against lateral movement within the windows, the first side edge of the first splash bar being underneath the lower bearing surface of the generally central retainer member to retain the first side edge of the first splash bar seated on one of the upper surface portions of the horizontal beams against being vertically dislodged within the windows; and (e)(1) pushing or pulling the first splash bar as appropriate along the longitudinal axis of the first splash bar to align and interlock a plurality of the locking structures on one side of the elongated slot along the second edge of the of the first splash bar with a plurality of aligned projections extending from the lower surface of the unitary extensions perpendicular to the front or back of the horizontal beam of the locking portions of the horizontal beams through which the aligned vertical suspension member extends, such that the projections interlock with the locking structures on the first splash bar to retain the first splash bar against longitudinal dislodgement in the windows and to retain the second side edge of the first splash bar seated on the upper surface portion of the horizontal beams against vertical dislodgement within the windows.

49. The method of claim 48, wherein the width of each window corresponds to a width of two splash bars, and wherein the horizontal beams at each successively lower vertical level within the hanger grid are oriented 180° with respect to each other, such that the first end of one horizontal beam is located under the second end of a vertically adjacent horizontal beam; and wherein the method further comprises, after (d), (d1) sliding a second splash bar along its first edge onto a horizontally adjacent upper surface portion of the horizontal beams on a same vertical level or on adjacent vertical level on one side of and adjacent the lower bearing surface of the generally central retainer members into aligned windows of the plurality of hanger grids until the elongated slots on the second side edge of the second splash bar aligns with vertical suspension members of the parallel hanger grids;

(d2) laying the second splash bar flat on the horizontal beams of the same or adjacent vertical level with the elongated slots along the second side edge aligned with the vertical suspension members and with the first side edge underneath the lower bearing surface of the generally central retainer members of the respective same or adjacent vertical level where the second splash bar in an adjacent level is in a location staggered horizontally and vertically from the first laid splash bar to retain the first side edge of the second splash bar seated on one of the upper surface portions of the beams from being laterally and vertically dislodged within the window; and in lieu of (e)(1), (e)2) pushing or pulling the first splash bar as appropriate and substantially simultaneously pulling or pushing the second splash bar as appropriate in the opposite direction from the first splash bar and along the longitudinal axis of the respective first and second splash bars to align and interlock their respective locking structure with a plurality of aligned projections extending from the lower surface of the unitary extensions in opposite directions perpendicular to the front or back of the horizontal beam to retain the first and second splash bars against longitudinal dislodgement in the windows and to retain the second side edges of the first and second splash bars seated on the upper surface portion of the horizontal beams against vertical dislodgement within the windows.

\* \* \* \* \*